VIDEO RECORDING CONTROL AND SYNCHRONIZING SYSTEM

Filed April 21, 1966 5 Sheets-Sheet 1

INVENTOR.
ROBERT J. YOUNGQUIST
BY
Carpenter, Kinney & Coulter
ATTORNEYS

INVENTOR.
ROBERT J. YOUNGQUIST
BY
Carpenter, Kinney & Coulter
ATTORNEYS

VIDEO RECORDING CONTROL AND SYNCHRONIZING SYSTEM

Filed April 21, 1966 5 Sheets-Sheet 3

INVENTOR.
ROBERT J. YOUNGQUIST
BY
Carpenter, Kinney & Coulter
ATTORNEYS

VIDEO RECORDING CONTROL AND SYNCHRONIZING SYSTEM

INVENTOR.
ROBERT J. YOUNGQUIST
BY
Carpenter, Kinney & Coulter
ATTORNEYS

VIDEO RECORDING CONTROL AND SYNCHRONIZING SYSTEM

Filed April 21, 1966

INVENTOR
ROBERT J. YOUNGQUIST
BY Carpenter, Kinney & Coulter
ATTORNEYS 3,390,231

VIDEO RECORDING CONTROL AND SYNCHRONIZING SYSTEM

Robert J. Youngquist, Village of Arden Hills, Minn., assignor to Minnesota Mining and Manufacturing Company, St. Paul, Minn., a corporation of Delaware Continuation-in-part of application Ser. No. 373,365, June 8, 1964. This application Apr. 21, 1966, Ser. No. 544,167
10 Claims. (Cl. 178—6.6)

ABSTRACT OF THE DISCLOSURE

A video tape transducing apparatus of the type in which a tape has a video signal recorded in a series of oblique tracks and a control signal recorded along one longitudinal edge of the tape is shown wherein the tape is driven longitudinally at a constant speed adjacent a transducing head which is rotated obliquely to the longitudinal direction of the tape and at a relatively high speed and during playback a first pulse signal generated by each revolution of the head is used for synchronizing track position and head position in a servo system which controls a braking member and a second pulse signal generated by each revolution of the head is used for supplying a vertical synchronizing signal to the video signal reproduced from the tape by the head.

This is a continuation-in-part of application Ser. No. 373,365, filed June 8, 1964.

The present invention is concerned with improved transducing apparatus for recording high frequency signals and in one aspect to apparatus suitable for recording television signals and the like.

Various arrangements have been proposed in the past for recording high frequency signals or television signals comprising video signals having picture signals, synchronizing signals and blanking signals with separate audio signals. In some cases, the entire television signal has been recorded longitudinally along a tape. Due to the very high frequencies involved, it is necessary to have a tape moving at very high speeds and the total amount of tape thus necessary in order to record a program of any length becomes very high. It has also been proposed to employ a system in which the recording head is moved at right angles to the tape as the tape is moved longitudinally. In order for this system to be feasible, it is usually necessary to employ a plurality of heads with a rather complicated switching arrangement for sequentially using the signals recorded by the several heads and eliminating the overlapping portions of the signals recorded by the different heads. It has also been proposed to employ a recording system in which the tape is helically disposed over a drum carrying a recording head. The drum is driven at a relatively high speed as compared with the speed of the tape. This results in a series of oblique tracks, each of which is much longer than the width of the tape. With this system, it is possible using a single head and not excessively high speeds to record an entire field as the head passes from one edge to the opposite of the tape.

My invention is concerned with a transducing system in which the head moves obliquely to the longitudinal direction of the tape, and in one embodiment to a system in which the tape extends helically over the recording head. From the teachings of this invention, a relatively simple recorder employing such a transducing system avoids certain of the disadvantages present in recorders of the prior art. Many of these prior art arrangements have been quite complicated. The present invention may be utilized to develop a recorder for television signals which is relatively inexpensive so as to make it possible to utilize the same economically for noncommercial recording of television programs. The television signals comprise video signals having picture signals, synchronizing signals and blanking signals and separate associated audio signals.

In order to provide an economical relatively simple recorder for television signals, a number of novel features are employed. In the first place, in order to employ the expedient of a head rotating obliquely to the direction of tape travel, it is necessary to control accurately the synchronization of the head position with the incoming video signal. I accomplish this during the recording operation by generating a pulse signal indicative of the position of the head. The pulse signal is compared at a novel comparator circuit with a synchronizing signal derived from the video signal which synchronizing signal is recorded as a control signal along one edge of the tape which is first erased. During playback, the recorded synchronizing control signal is reproduced and compared with a pulse signal indicative of head position and through the novel comparator circuit, the synchronization of the head position with the tract position of the video signal is maintained.

One of the features of this invention is that in one embodiment the pulse signal indicative of the head position is used not only to control the synchronization of the head position with the recorded synchronizing signal but it is used to supply a vertical synchronizing signal to replace that lost when the edge of the tape was erased.

Another feature of my invention is that in another embodiment the pulse signal indicative of the head position is used to synchronize the head position with the recorded synchronizing signal while a clamp pulse signal, produced after the head position pulse signal was produced, is used to replace the vertical synchronizing signal lost when the edge of the tape was erased.

A still further feature of my invention is that in one embodiment the pulse signal indicative of head position is used to blank out the signal from the reproducing head as it passes the edges of the tape on which the control signal and audio signals are recorded.

In another embodiment, a clamp pulse, produced after the head position pulse signal, is used to blank out the signal from the reproducing head as it passes the edges of the tape.

A further feature of my invention is that low frequency components lost during recording due to the high relative speeds between the head and tape are replaced during reproduction with novel clamping circuits.

A still further feature of this invention is that the television signals can be recorded directly and without frequency modulation as is conventionally utilized in recorders wherein the head moves at an angle oblique to the direction of movement of the tape.

A still further feature of this invention is a novel support for a recording head having means to insure close contact between the recording tape and the head despite high speed relative movement between the tape and head.

Further features of this invention will become apparent from a consideration of the accompanying specification, claims, and drawing of which:

Figure 1:
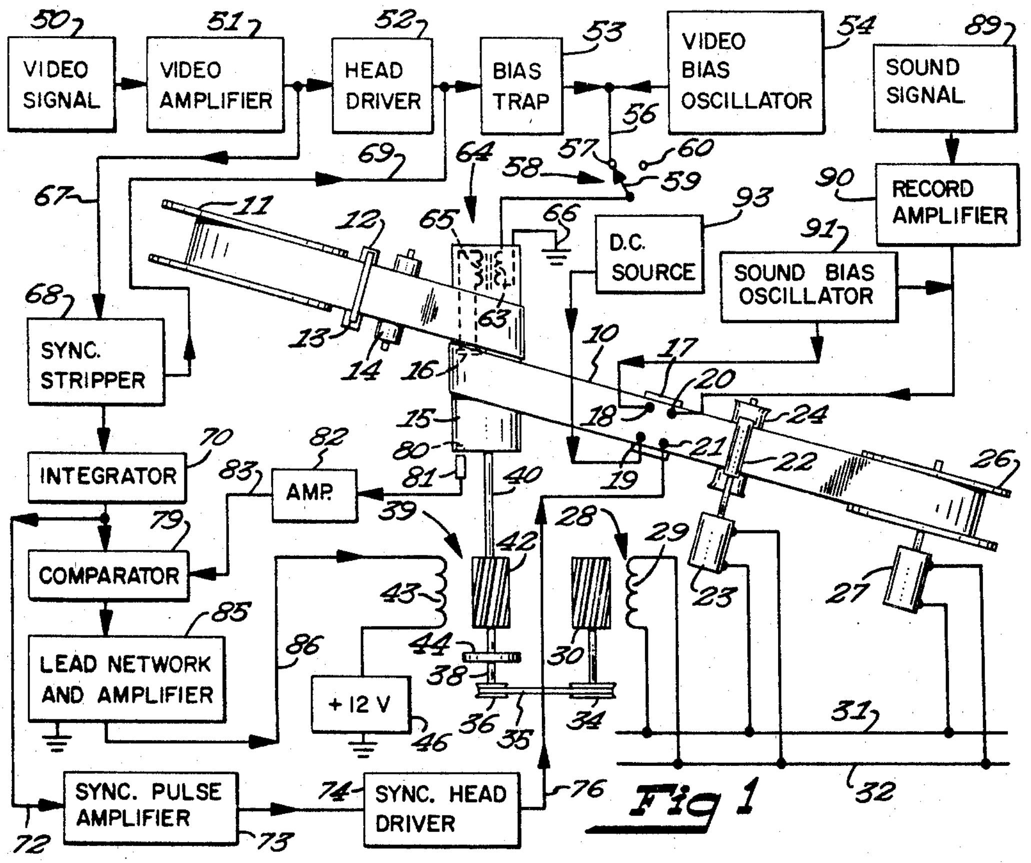
FIGURE 1 is a schematic view of the recording portion of the apparatus with the various circuit components being shown in block diagram form.
Figures 4, 5, 6, 7:
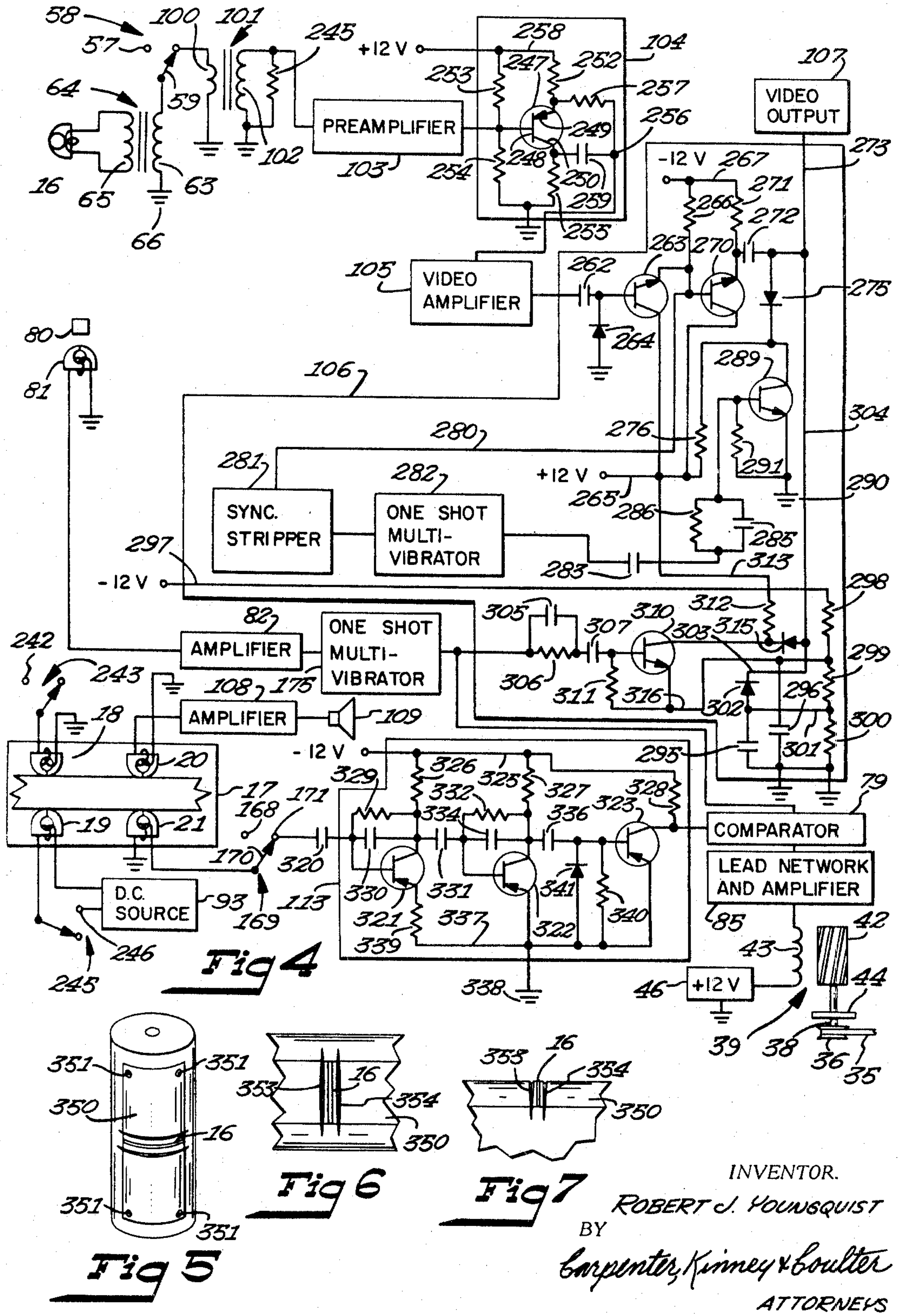
FIGURE 4 is a schematic view of the reproducing or playback portion of the apparatus in which, as in FIGURE 3, various circuit components of the invention have been shown in circuit form.
FIGURE 5 is an isometric view of the rotating drum over which the tape is passed.
FIGURE 6 is a top plan view of a portion of the drum showing in more detail the location of the recording and reproducing head and certain auxiliary slots associated therewith.
FIGURE 7 is a side view of the same portion of the drum.

Referring to FIGURE 1 of the drawing, I have shown in schematic form one embodiment of the recording portion of my apparatus. A magnetic tape 10 is mounted on the supply reel 11. After leaving the supply reel 11, the tape passes a cylindrical guide post 12, being held against the guide post by a spring loaded felt member 13. The tape then passes over an inertia roller 14 and from there helically over a rotating drum 15 which carries the transducing or recording and reproducing head 16. The construction of the drum 15 and the head 16 are best shown in FIGURES 5, 6 and 7 and will be described later. After leaving the drum 15, which will be discussed in more detail later, the tape 10 passes over a head assembly 17 comprising erase heads 18 and 19, a sound recording head 20 and a synchronizing signal head 21. The tape next passes between a capstan 22 driven by a motor 23 and a pressure roller 24. The tape finally passes onto a take-up reel 26 driven by a motor 27. The motor 27 drives the take-up reel 26 at a speed such that the tape 10 tends to be driven at a somewhat higher speed than it is driven by the capstan 23. A suitable slip connection (not shown) is provided between the motor 27 and the take-up reel 26 to allow for this difference in speed. The relative speed at which the take-up reel 26 tends to move the tape as compared to that at which it is driven by the capstan 22 varies, of course, with the amount of tape on the take-up reel.

The drum 15 is driven by a suitable induction motor 28 having a field winding 29 and a rotor 30. Field winding 29 is connected to line conductors 31 and 32 leading to a suitable commercial source of alternating current power. The motors 23 and 27, driving the capstan 22 and the take-up reel 26 respectively, are likewise connected to line conductors 31 and 32. The shaft of the motor 28 has a relatively large pulley 34 which has a belt 35 thereon extending over a relatively smaller pulley 36 secured to a shaft 38 of a braking motor 39. The shaft of the braking motor is in turn secured to the shaft 40 of the drum 15. The braking motor 39 comprises a conventional squirrel-cage rotor 42 and a field winding 43. Interposed between the rotor 42 and the pulley 36 is a flywheel 44 for stabilizing the speed at which the drum 15 is driven by motor 28 and braking motor 39.

As will be pointed out in more detail later, the motor 28 tends to drive the drum 15 at a speed somewhat higher than desired. The winding 43 of the braking motor 39 is supplied with a direct current voltage from a source 46 under the control of apparatus to be presently described. Very broadly, the application of direct current to winding 43 tends to cause a braking effect to be present to reduce the speed of the drum 15 below that at which it would normally be driven by motor 28 through the belt 35. The D.C. energization of winding 43 is adjusted in accordance with the comparative position of the drum and the incoming video signal to maintain a desired relationship so that the head 16 passes diagonally from one edge of the tape to the opposite edge at the end of each field of the video signal.

Referring now to the energization of the head 16, a video signal 50 may be derived from a television receiving set. This signal is taken off of the set at a point subsequent to the video detector and prior to the time that the video signal is applied to the picture tube of the set. The video signal comprising a picture signal horizontal synchronizing pulses and vertical synchronizing pulses is first passed through a video amplifier 51 and from there through a video head driver 52. This head driver is designed to provide suitable pre-emphasis and will be dscribed in more detail later in connection with FIGURE 3. From the head driver, a signal passes through a bias trap 53 where it has added to it the output of a video bias oscillator 54. In one embodiment of my apparatus, this video bias oscillator is tuned to provide an output of 7 megacycles per second. The bias trap 53, which will be referred to in more detail later, is tuned to be resonant at this frequency and to block the output of the bias oscillator from being applied to the head driver. The combined output of the oscillator and the amplified video signal passes through a conductor 56 to the "record" contact 57 of a switch 58 having a movable contact member 59 and a further fixed "playback" contact 60. Since FIGURE 1 shows the apparatus in the record cycle, the movable switch contact 59 is in engagement with the record contact 57. From the movable switch contact 59, the current passes to one terminal of one winding 63 of a coupling transformer 64, the other terminal of which is connected to ground at 66. The coupling transformer 64 has two windings 63 and 65 which are wound concentrically. The winding 63 is a stationary winding whereas the winding 65 moves with the drum 15. By means of the transformer 64, it is possible to couple the head 16 to either an input signal (in the record cycle) or to output means (in the playback cycle). The winding 65, which revolves with the drum 15, is coupled to the head 16.

It will thus be seen that the video signal 50 is amplified, is modified by the bias oscillator 54, and is then applied through the transformer 64 to the head 16. This video signal is, in turn, recorded on the tape as the drum 15 revolves and the tape 10 is driven longitudinally at a constant speed. As previously mentioned, the drum is controlled so as to rotate in the same direction as the tape is driven and at such a rate that the head moves from one edge of the tape obliquely across the tape to the opposite edge during a time equal to one field of the video signal.

The output of the video amplifier 51 is also connected through a conductor 67 to a synchronizing signal stripper 68 of conventional type. This stripper is commonly referred to as a "sync stripper" and will be so referred to in the subsequent specification. The output of sync stripper 68 is connected through a conductor 69 to the output of the head driver 52 in order to introduce the amplified synchronizing signal into the signal being supplied to head 16, reinforcing these synhronizing signals.

The output of the sync stripper 68 is also connected to an integrator 70 to derive from the sync signal a vertical sync signal. This vertical synchronizing signal is used in two ways. In the first place, the output of integrator 70 is connected through conductor 72 to a sync pulse amplifier 73. This sync pulse amplifier will be described in more detail later. The output of the sync pulse amplifier as in turn connected to a sync head driver 74 and the output of this sync head driver 74 is connected through a conductor 76 to the synchronizing signal head 21, which is effective to record this synchronizing signal as a control signal along one edge of the tape.

The output of the integrator 70 is also connected to a comparator 79 which receives not only the vertical synchronizing signal, but also a signal which is indicative of the speed at which the drum 15 is rotated. Located within the drum 15 in one end thereof is a permanent magnet 80. Located adjacent to the drum, closely adjacent to the path of the magnet 80, is a typical magnetic pickup head 81. Each time that the magnet 80 passes the head 81, a pulse is produced in the output of head 81. This pulse is passed through a pulse amplifier 82 and connected through conductor 83 to the comparator 79. The comparator thus receives not only the output of integrator 70, but also receives the output of amplifier 82 which is a pulse output indicative of the speed at which the drum 15 is being rotated. The output of comparator 79, which depends upon the relative values of the two signals fed to it, is connected to a lead network and amplifier 85. This amplifier and network, which will be described in more detail later, serves to amplify the output of the comparator and to introduce a certain lead factor to reduce hunting. This output is connected through a conductor 86 to the winding 43 and serves to control the amount of direct current supplied by source 46 to winding 43. The more direct current that flows through winding 43, the more will be the braking effect that is exerted by the braking motor 39. As will be more apparent from the subsequent description, this braking effect is so adjusted as to maintain a desired synchronization between head position and the video signal.

The sound is recorded along the opposite edge of the tape from the synchronizing control signal by head 20. The sound signal 89 derived from the television set is applied through a "record" amplifier 90 to the record head 20. Connected between the record amplifier 90 and the record head 20 is a sound bias oscillator 91 which functions in the usual manner to superimpose upon the signal applied to the head 20 a signal having a frequency such as to provide the desired bias to the signal applied to the tape.

Erase heads 18 and 19 are provided for erasing along the edges of the tape 10 where the control and sound signals are to be applied. The erase head 18 is connected to the output of the bias oscillator 91 to apply a high frequency alternating current to the erase head 18. The erase head 19 is connected to a direct current source 93, it being more desirable to use a direct current for erasing along the track where a control signal is to be recorded.

Very briefly summarizing the operation of the record apparatus, the video signal is amplifier and has superimposed thereon the usual bias signal. Also superimposed on the video signal is the output of the sync stripper which serves to reinforce the synchronizing signals. This combined signal is applied to the stationary winding of transformer 64, the output of which is applied to head 16. The speed of the drum 15 is measured by means of the head 81 which is associated with the magnet 80 carried by the drum 15. The pulse signal produced in this head 81 is compared with the integrated signal from the sync stripper so as to compare the position of the head 16 with that of the video signal to insure that the head passes the edges of the tape at the end of each field of the video signal. The integrated output of the sync stripper is also applied through an amplifier and a head driver to the head 21 to record along one edge of the tape, a signal which is essentially indicative of the track position of the video signal. The sound signal 89 is amplified in the usual manner and has applied thereto a suitable biasing oscillator. The combined signal is applied to the sound recording head 20. Previous to the tape passing by the sound head 20 and the synchronizing signal head 21, the portions of the signals along these edges of the tape are erased by erase heads 18 and 19. As will be pointed out in more detail later, only a small portion of the actual video signal is erased, most of the signal being erased being the vertical synchronizing signal. As previously pointed out, the speed of the head is such that it completes one field each revolution of the head and the apparatus is so operated that the head passes from one edge of the tape to the opposite edge of the tape at the end of a field where the vertical synchronizing signal is located. As will be further pointed out in connection with the record cycle, I have provided means for replacing the vertical synchronizing signal which is lost in the recording process.

Figure 2:
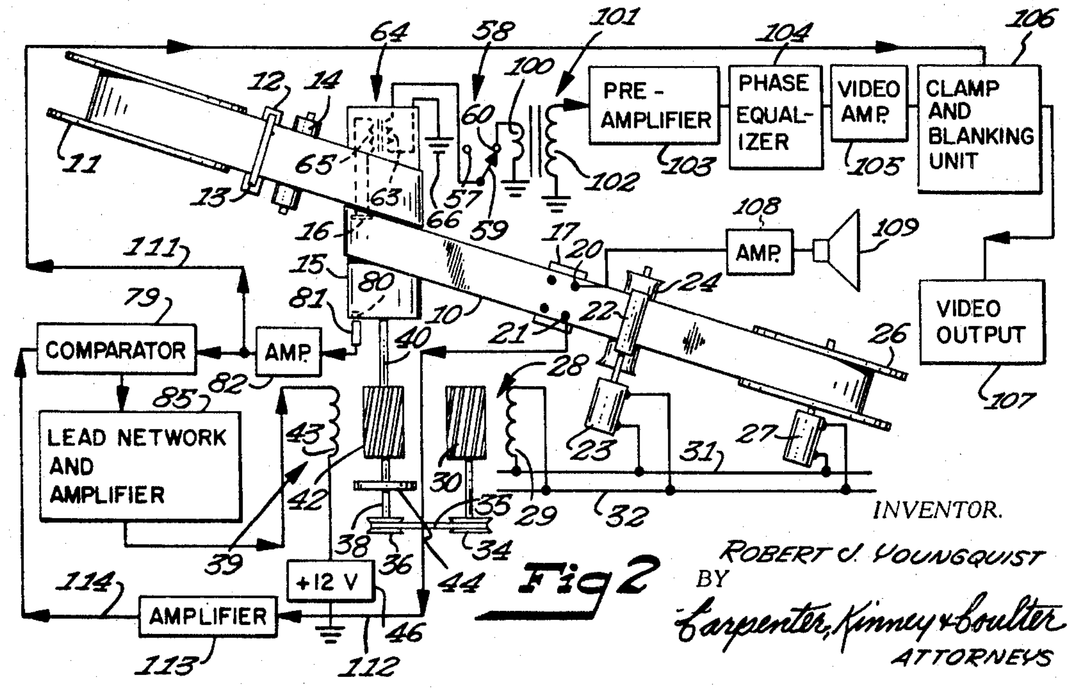
FIGURE 2 is a view of the reproducing or playback portion of the apparatus with the same type of showing as in FIGURE 1.

Turning to FIGURE 2, I have shown schematically one embodiment of an apparatus utilizing the teachings of this invention for reproduction or playback of the recorded signals. The mechanism for driving the tape is exactly the same, as is the drum 15. Consequently, the same reference numerals have been applied in this figure as were employed in FIGURE 1. It is, of course, understood that the apparatus employs a number of switches for switching over from the record to the playback cycle and these switches, with the exception of switch 58, are not shown in this figure in order to simplify the description and facilitate a more ready understanding of the general operation of the apparatus. The switch 58, which was referred to in connection with FIGURE 1, has a movable switch blade 59 shown in engagement with the "playback" contact 60 instead of the "record" contact 57. Other than this, none of the switching connections are shown.

As the tape 10 passes over the drum 15, which is revolving at a relatively high speed, the signal picked up by head 16 is conveyed to the rotary winding 65 of the coupling transformer 64. The signal is accordingly induced in the stationary winding 63 which, as in the record cycle, has one end grounded and the other end connected to the movable switch contact 59 and passes through the playback contact 60 to the primary winding 100 of a step-up transformer 101. This transformer has a four-to-one ratio and acts to quadruple the relatively small voltage output of the head 16. The secondary winding 102 of this transformer 101 is connected to a pre-amplifier 103 which may have incorporated in it certain pre-emphasis networks in the conventional manner. From the pre-amplifier, the signal is passed to a phase equalizer 104 which will be described in more detail later. This phase equalizer is designed to compensate for the shift in phase in the transmission of the various components of the signal due to differences in frequencies of these components. From the phase equalizer, the signal goes to a video amplifier 105 and from there to a clamp and blanking unit 106. This clamp and blanking unit forms a very essential part of my apparatus and will be described in more detail later. For the present, it can be stated that this unit serves to clamp the signals to restore certain low frequency components. It also serves through the signal derived from head 81 associated with magnet 80 to blank out the portion of the signal due to the head passing over the edges of the tape along which the sound and control signals are recorded. These two signals would, if transmitted to the video output, create disturbance since they are not properly part of the video signal. Furthermore, the clamp and blanking unit also serves to reinsert the vertical synchronizing signal, which, as previously explained, was lost during the recording process. The output of the clamp and blanking unit 106 is, as a result of the various steps taken therein, a video signal capable of being applied to a video output device such as a picture tube to produce a picture relatively free from distortion and with the vertical synchronizing signal replaced. The numeral 107 is used to designate a suitable video output device.

The output of head 81, which again is indicative of the speed at which drum 15 is being driven, is supplied through the amplifier 82 to the clamp and blanking unit 106 to perform the steps just described. The output of amplifier 82 is also supplied to the comparator 79.

The synchronizing head 21 serves to pick up the control signal recorded along the edges of the tape scanned by it and this output is connected through a conductor 112 to an amplifier 113, the output of which is connected through a second conductor 114 to the comparator 79. Thus, the comparator 79 has supplied to its a signal from the head 81 indicative of drum position and a signal from head 21 indicative of the track position of the video signal. Again, the comparator acts to compare these signals and produce an output dependent upon the relative values of the two signals supplied to it. This output controls the amount of current supplied from the direct current source 46 to the winding 43 of the braking motor 39 to control the speed at which the drum 15 is driven by the motor 28. Thus, the comparator is used to maintain the desired synchronization between the position of the head and the track position of the video signal.

The sound head 20 picks up the signal recorded along the sound track and supplies this through an amplifier 108 to a suitable audio output device 109. The operation of the audio signal is otherwise entirely conventional and needs no detailed explanation.

Figure 3:
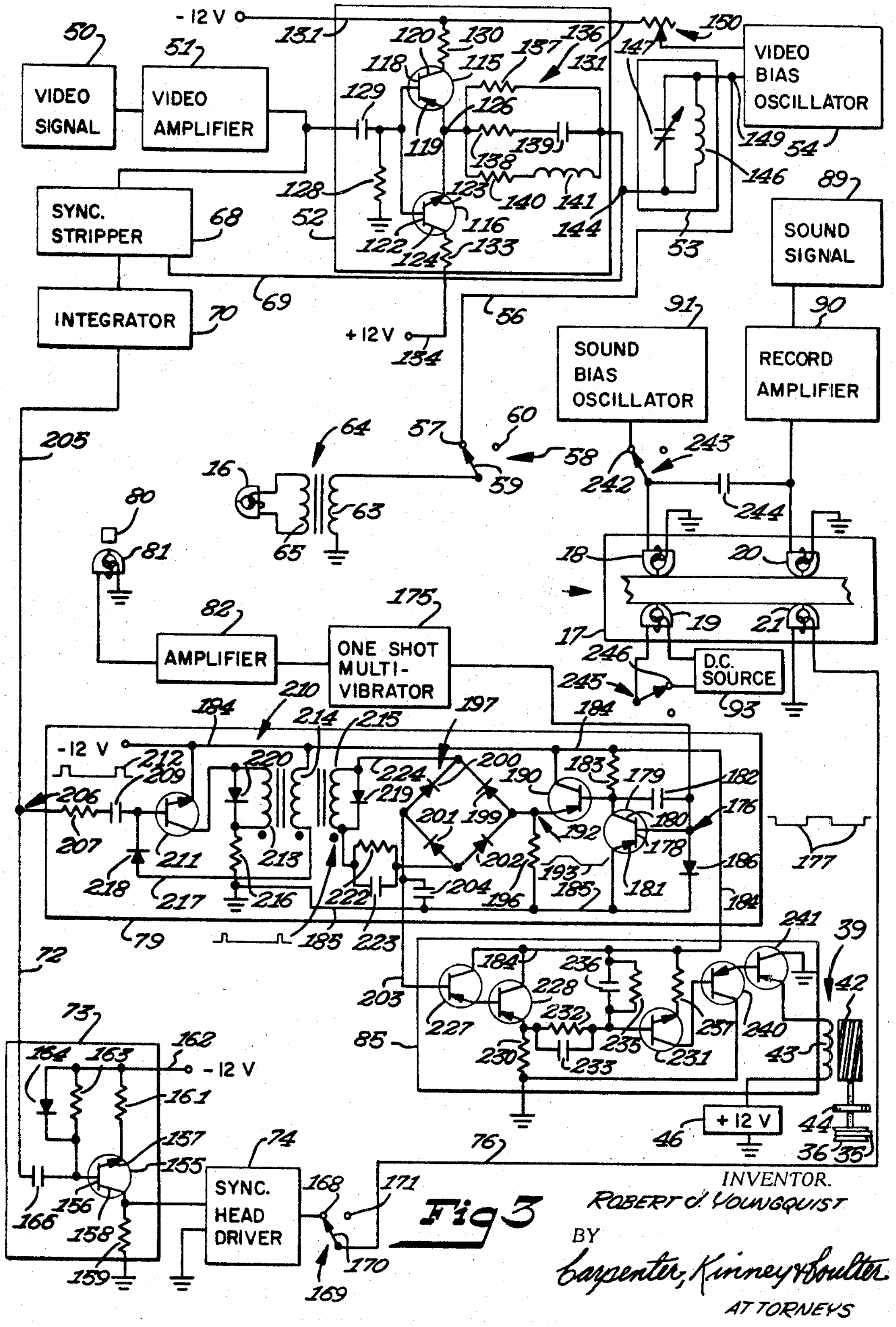
FIGURE 3 is a schematic view of the recording portion of the apparatus with certain novel circuit components of the invention being shown in circuit form.

In connection with FIGURES 1 and 2, I have described the general operation of one embodiment of a record and playback portion of my apparatus. In FIGURES 3 and 4, I have shown the circuit details of a number of the components, which were shown in block diagram in FIGURES 1 and 2 for the purposes of simplicity. Inasmuch as an understanding of some of these circuit components is necessary to a complete understanding of the novel features of my invention, reference will now be made to FIGURES 3 and 4.

DESCRIPTION OF FIGURE 3

Referring first to FIGURE 3, I have again shown the source of video signal 50 and the video amplifier 51 in block diagram form since, as previously pointed out, there is nothing unique about these units. I have, however, shown the head driver 52 in circuit form. This head driver comprises a pair of transistors 115 and 116. Transistor 115 is a PNP transistor having a base 118, an emitter 119 and a collector 120. Transistor 116 is an NPN transistor having a base 122, an emitter 123 and a collector 124. The two transistors 115 and 116 are connected in a complementary emitter-follower circuit. The emitters 119 and 123 are connected together to a common output terminal 126. The two bases 118 and 122 are likewise connected together. A resistor 128 is connected between the common junction of the bases and ground. The output of the video amplifier 51 is connected through a blocking capacitor 129 to this common junction of the two base electrodes so that the input is applied between this common junction and ground across resistor 128.

The collector 120 of transistor 115 is connected through a resistor 130 to a conductor 131 leading to a suitable source of negative potential. In one particular embodiment of the invention, conductor 131 was connected to a point twelve volts negative with respect to ground. The collector 124 is connected through a resistor 133 to a conductor 134 leading to a source of potential positive with respect to ground. In the same embodiment referred to previously, this conductor 134 was connected to a source of potential twelve volts positive with respect to ground.

The amplifier circuit comprising transistors 115 and 116 constitutes, in effect, two emitter-follower circuits connected back to back and hence results in a low source impedance regardless of which direction the signal is changing.

The output of the amplifier as measured between output terminal 126 and ground is connected through a pre-emphasis network 136. This network comprises three parallel branches, one consisting of merely a resistor 137, another of a resistor 138 and a condenser 139, and a third of a resistor 140 and an inductor 141. The network 136 serves to emphasize lower frequencies and higher frequencies. These frequencies tend to be attenuated in the recording action and it is desirable to emphasize them prior to recording.

Referring to the operation of the pre-emphasis network 136, the lower leg of the network has a relatively low impedance at low frequencies. This is due to the fact that the impedance offered by inductor 141 is very low for low frequencies so that the impedance is primarily determined by the resistance of resistor 140. As the frequency of the signal increases, however, the inductor 141 offers an increasing amount of impedance and the impedance of the network is determined to a large extent by the impedance of resistor 137 in the upper leg. As the frequency reaches a higher range, however, the condenser 139 offers less and less impedance and the impedance of the total network again drops because of the low impedance of the leg including condenser 139. Thus, the impedance network 136 offers a low impedance to both low frequency and high frequency signals and offers a substantially higher impedance to signals in an intermediate frequency range. In this way, emphasis is placed upon the low frequency and high frequency signals which would tend to be attenuated during the recording.

The amplified video signal, after it leaves the unit 52, including the amplifier just described and the pre-emphasis network 136, has added to it a signal from the sync stripper 68 which is connected by conductor 69 to the junction point 144, to which is connected the output of the head driver 52. As previously pointed out, the effect of adding a signal from the sync stripper is to reinforce the synchronizing signal which subsequently becomes somewhat attenuated due to the clamping action employed during the reproducing cycle.

From junction point 144, the video signal combined with the output from the sync stripper 68 passes through the bias trap 53. This bias trap consists of an inductor 146 and a variable capacitor 147. The inductance and capacitor 147 form a resonant network which is tuned to the frequency of the bias oscillator. The function of the bias trap 53 is to permit the video signal to pass through but to prevent the signal from the bias oscillator 54 from being grounded through the sync stripper or the head driver 52. At the terminal 149, on the output side of the bias trap 53, the video signal has added thereto the signal from the bias oscillator 54. The bias oscillator is supplied with power from conductor 131 leading to the source of negative potential through a rheostat 150. From junction point 149, the combined outputs of the video head driver 52, the sync stripper 68 and the bias oscillator 54 pass through conductor 56, contact 57, and movable switch contact 59 to the stationary winding 63 of coupling transformer 64. The movable winding 65 of this coupling transformer is connected to head 16 as previously described.

The signal that is being supplied to the synchronizing signal head 21 to record a control signal on one edge of the tape will now be considered. As described in connection with FIGURE 1, a signal from the sync stripper 68 is passed through an integrator 70 to produce a vertical sync signal. This vertical sync signal passes through conductors 205 and 72 to the input of the sync pulse amplifier. This sync pulse amplifier comprises a transistor 155 of the NPN type. The transistor 155 has a base 156, an emitter 157 and a collector 158. A resistor 159 is connected between the collector 158 and ground and it is the upper terminal of this resistor that constitutes the output terminal of the synchronizing pulse amplifier 73. The emitter 157 is connected through a resistor 161 to a conductor 162 leading to a suitable source of negative potential. In one particular embodiment of my invention, this conductor was connected to a source of potential at minus twelve volts. Connected between conductor 162 and the base 156 is a resistor 163 which is bypassed by a diode 164 which is so disposed as to pass current only from conductor 162 in the direction of the base 156. The incoming vertical synchronizing pulse is coupled to the base 156 through a blocking condenser 166. The peaks of the synchronizing pulses are positive in polarity and when applied to the base 156 raise the potential of the base with respect to that of the emitter 157 to cause the transistor to conduct current through the output resistor 159 and collector 158, emitter 157 and resistor 161 to conductor 162. The function of the diode 164 is to provide a clamping effect. The gain of the various amplifiers between the output of the video amplifier 51 and the synchronizing signal head 21 is such that the signal applied to the synchronizing pulse amplifier can be limited in both the negative and positive directions. In order to provide a uniform signal, the clamping diode 164 serves to clamp the base line of the signal to a minus twelve volt value. The output pulses of the synchronizing pulse amplifier 73 are limited in a positive direction by saturation of the transistor 155. Thus, the output of amplifier 73 is limited in both the positive and negative directions and a rectangular voltage of uniform wave form is applied to the sync head driver 74. While I have not shown details of this sync head driver, it is to be understood that this may include a further clamping circuit which operates to clamp the base line of the pulse signal to ground.

From the sync head driver, the signal passes through a fixed "record" contact 168 of a changeover switch 169 having a movable contact 170 and a fixed "playback" contact 171. It is to be understood that all of the various changeover switches may be ganged together. Thus, movable contact 170 is mechanically connected to the movable contact 59 so as to be operated simultaneously therewith. From the movable contact 170, the synchronizing pulse signal passes through conductor 76 to the synchronizing signal head 21 so that a series of abrupt pulses are recorded along the edge of the type.

The operation of the comparator circuit 79 and the lead network and amplifier 85 will now be considered.

As previously pointed out, the head 81 located adjacent to the magnet 80 carried by the drum 15 generates a pulse each time that the drum 15 completes one revolution. This pulse is amplified by amplifier 82 and passed through a one-shot multivibrator 175. This one-shot multivibrator may contain two stages but for purposes of simplicity is shown as a single multivibrator. The resulting output of the multivibrator is a rectangular wave shown applied to the junction point 176. As indicated the wave is rectangular having negative pulses 177, the leading edges of which are spaced from each other by a distance depending upon the speed of the drum 15. These pulses are applied to the base 178 of a PNP transistor 179 having, in addition to base 178, a collector 180 and an emitter 181. Connected between the input point 176 and the collector 180 is a condenser 182. The collector 180 is connected through a resistor 183 to a conductor 184 leading to a source of negative potential. In one particular example, I employed a source of potential at minus twelve volts. The emitter 181 is connected to a conductor 185 which is grounded. A diode 186 is connected between the base and ground to clamp the base line of the applied voltage to ground and insure that at no time the base line voltage exceeds ground potential.

Prior to the application of a negative pulse to the base 178, the condenser 182 is initially charged through the circuit including condenser 182 and resistor 183. When the condenser discharges, due to the application of the negative pulse, the potential of the base is lowered with respect to that of the emitter 181 to cause the voltage drop across the emitter and collector to gradually decrease. As soon as condenser 182 is fully discharged, the resulting voltage drop across the emitter and collector is constant until the pulse terminates. The condenser 182 then starts to charge gradually, increasing the voltage drop across the emitter 181 and collector 180. The result is a trapezoidal wave form in which the emitter collector voltage falls off, flattens out and then increases again.

This voltage is then applied to the base of a further PNP transistor 190, the collector of this transistor being connected to the conductor 184 leading to the negative source of potential. The emitter of transistor 190 is connected to ground through resistor 196. The voltage produced by the varying conduction of transistor 179 appears across resistor 196 between terminal point 192 and ground conductor 185. The resulting wave form 193 is trapezoidal and positive. The beginning of the initial slope of each trapezoidal peak is determined by the initiation of the pulse 177. The end of the flat portion of each pulse is marked by the end of the pulse 177. There is then another slanting portion to the pulse which is due to the discharge of condenser 182. It is the upwardly sloping portion of the pulse which is used for control purposes for controlling the energization of the winding 43 of the braking motor 39 as will be presently described.

The output of transistor 190, as it appears across the resistor 196, is passed through a rectifier gate 197 to a condenser 204 which is connected through a conductor 203 to the input of the lead network and amplifier 85. The rectifier gate 197 is normally nonconductive and becomes conductive only upon the application to control terminals thereof of a pulse voltage. The rectifier gate 197 consists of four diodes 199, 200, 201 and 202. The upper terminal of resistor 196 is connected to the junction of diodes 199 and 202. The condenser 204, which is connected to the input of the lead network and amplifier 85, is connected to the junction of diodes 200 and 201. It will be noted that the output across resistor 196 cannot normally be passed through to condenser 204 since any current tending to flow through diode 199 is blocked by diode 200. Similarly, the current cannot flow through the lower two legs of the bridge due to the blocking action of diode 202. By means presently described, rectifier gate 197 is periodically rendered conductive to permit the voltage pulses across resistor 196 to pass through the rectifier gate 197. These voltage pulses when so passed are applied to charge the condenser 204 which is connected to the output terminal of the gate 197 between diodes 200 and 201 and ground conductor 185.

Going over to the left hand side of the comparator 79, the output of integrator 70 is connected by a conductor 205 to the input terminal 206 of the comparator 79. The voltage so applied consists of a series of positive pulses, illustrated as wave form 212, the leading edges of which are spaced from each other by a distance equal to the spacing between the vertical synchronizing pulses. This vertical synchronizing signal is applied through a resistor 207 and a blocking capacitor 209 to a blocking oscillator generally designated by the reference numeral 210. This blocking oscillator includes a transistor 211 of the NPN type having the usual base, emitter and collector. The emitter is connected to conductor 184 leading to a source of negative potential so that upon application of a positive pulse to the base, the emitter becomes conductive. Transistor 211 is connected in series with the primary winding 213 of a pulse transformer having the primary winding 213, a feedback winding 214 and an output winding 215. Upon transistor 211 being rendered conductive by the application of the vertical synchronizing pulse to the base of transistor 211, current flows through a resistor 216, the primary winding 213 and transistor 211 to the conductor 184 connected to the negative source of potential. The result of this is that there is an abrupt flow of current through the winding 213. This induces in the feedback winding 214 a voltage pulse, the polarity of this pulse being positive as measured between the lower and upper ends, respectively, of winding 214. This positive pulse is applied through conductor 217 and diode 218 to the base of transistor 211 to further increase the conductivity of the transistor 211. The result is that the conductivity of transistor 211 rises rapidly to the saturation point. When this happens, current flow through primary winding 213 ceases to increase with the result that the feedback voltage induced in winding 214 drops to zero. This, in turn, results in the transistor 211 being cut off. The back voltage that will be present at the collector of transistor 211 when the field of the primary winding starts to collapse may be so high as to cause damage to the transistor. Consequently, a diode 220 is connected across the primary winding 213 to prevent voltage breakdown of the transistor 211.

The rapid buildup and then drop-off of the current through primary 213 results in a pulse being induced in output winding 215. The winding 215 is so disposed with respect to primary winding 213 that during the pulse, the lower end of the secondary winding 215 is positive with respect to the upper end. The winding 215 is connected across two opposite terminals of the rectifier gate 197 through a network consisting of a resistor 222 and a condenser 223. This network is provided for the purpose of providing a back bias for the rectifier gate 197. The voltage built up across condenser 223 tends to maintain the lowermost terminal of rectifier gate negative with respect to the uppermost terminal during the periods between pulses. The resistor 222 bypasses the condenser 223 to allow the voltage across condenser 223 to slowly leak off. When the pulse appears across secondary winding 215, this pulse causes a current flow from the lower end of winding 215 through a condenser 223, through diodes 201 and 200 on the one hand, and through diodes 202 and 199 on the other hand back through conductor 224 to the upper terminal of secondary winding 215. The effect of this pulse is to create current flow through both sets of diodes which now act as a voltage divider, the potential at the junction of diodes 202 and 199 being the same as at the junction between diodes 201 and 200. If the potential at the junction between diodes 202 and 199 is raised as a result of a voltage across resistor 196, the potential at the opposite junction, that is the junction between diodes 201 and 200 is correspondingly raised so that it is now possible for any voltage appearing across resistor 196 to be transmitted to the condenser 204 for the duration of the pulse. During this brief interval, condenser 204 is charged.

The extent of the charge depends upon the relative position of the pulse across winding 215 with respect to the trapezoidal voltage appearing across resistor 196. The phase position of the trapezoidal voltage is determined by the point at which the pulse is produced by head 81 which, in turn, is determined by the speed of the drum. The apparatus is designed so that when the drum is rotating at the proper speed with respect to the longitudinal speed of the tape as indicated by the vertical synchronizing pulses, the pulse appearing across secondary winding 215 will occur somewhere along the upwardly sloping portion of the trapezoidal pulse. If the pulse across winding 215 occurs just before the peak of the trapezoid, a relatively large voltage will appear across condenser 204. If, on the other hand, the pulse occurs near the low point of the upward slope of the trapezoid, a relatively small voltage will appear across condenser 204. Condenser 204 is thus subject to a series of pulses, the magnitude of which depends upon the relative phase position of the vertical synchronizing pulse and the pulse induced in the head 81 by reason of rotation of the drum. The voltage across condenser 204 is used to control the input to the lead network and amplifier 85 to, in turn, control the energization of braking winding 43 of the braking motor 39.

The operation of unit 85 will now be described. The voltage from condenser 204 is applied through conductor 203 to the base of a PNP transistor 227. This transistor is in turn connected through a compound connection to a second PNP transistor 228, the emitter of transistor 227 being connected to the base of transistor 228 and the collectors of the two transistors being connected together and to conductor 184 which, as previously pointed out, leads to a source of negative potential. The emitter of transistor 228 is connected to ground through a resistor 230. The emitter-collector voltage of transistor 228 is applied to the base of an NPN transistor 231 through a voltage divider network which functions to provide an anti-hunting effect. This network consists of a first resistor 232 and a capacitor 233 connected in parallel with each other between the emitter of transistor 228 and the base of transistor 231. Connected between the base of transistor 231 and conductor 184 leading to the source of negative potential, is a second resistor 235 and a second condenser 236. The resistance value of resistor 235 and the capacitance of condenser 236 are relatively small as compared with the resistance value of resistor 232 and the capacitance of condenser 233. In one particular embodiment of my invention, I employed a 47 kilohm resistor 232 and a 5 microfarad capacitor 233. In this embodiment, the resistor 235 had a resistance value of 4.7 kilohms and the condenser 236 a capacity of .25 microfarad. The two resistors 232 and 235 function as a voltage divider to apply a relatively small portion of the emitter-collector voltage of transistor 228 between the base and emitter of transistor 231, the emitter of transistor 231 being connected to the power supply conductor 184 by a resistor 237.

The function of condenser 233 is to provide an anti-hunting effect, as previously mentioned. If the voltage across condenser 204 changes as a result of the change in the relative speeds of the tape and the drum carrying the head 16, this change in voltage will pass more readily through the relatively large condenser 233 so as to cause a substantial increase in the proportion of the output of transistor 228 which is applied between the base and the emitter of transistor 231. Furthermore, this voltage, due to the phase shifting effect of capacitor 233, will tend to lead and cause the voltage to be applied to the base of transistor 231 earlier than would otherwise be the case. The function of condenser 236 is to by-pass any extremely high frequency components due to an erratic change in voltage.

Transistor 231 is in turn connected to a PNP transistor 240, the collector of which is connected to ground and the emitter of which is connected to the base of a further PNP transistor 241. The emitter collector path of transistor 241 is connected in series with winding 43 so that a current may flow from the positive terminal of direct current source 46 through winding 43, the emitter and collector of 241 and to ground, the current flow through this path depending upon the conductivity of the emitter collector path of transistor 241.

It will thus be seen that the current applied to winding 43 is controlled by the voltage on condenser 204 which, in turn, is dependent upon the relative phase relationship of the vertical synchronizing pulse and the pulse supplied by head 81 which produces the trapezoidal voltage at point 192.

Referring now to the over-all operation of the comparator circuit, if the drum 15 starts to speed up, the pulses 177 occurring at point 176 will become more closely spaced to each other. This will in turn advance the position of the trapezoidal voltage wave at point 192 causing the pulse appearing across the secondary winding 215 to occur at a later point along the upwardly sloping portion of the trapezoidal wave to produce a larger voltage across condenser 204 to increase the voltage on the base of transistor 227. Due to the various stages of amplification in amplifier 85, this will result in transistor 241 becoming more conductive to in turn cause more current to flow through braking winding 43. This increases the braking effect of the braking motor 39 to in turn reduce the speed with which drum 15 is driven by motor 28 (shown in FIGURE 1). This will result in the pulses 177 at point 176 becoming more widely spaced apart so as to retard the phase of the trapezoidal pulse at point 192. This in turn tends to increase the voltage appearing across condenser 204 to, in turn, reduce the current flowing through braking winding 43. The apparatus stabilizes at a point where the proper phase relationship is maintained between the vertical synchronizing pulses representative of the longitudinal speed of the tape and the pulses produced in head 81 as a result of drum rotation.

The effect of condenser 233, as previously pointed out, is to provide an anti-hunting effect. Any change in the voltage across condenser 204 as the result of the change in relative speeds of the drum and tape is transmitted through condenser 233 with a slight lead angle so that the braking effect of winding 43 is changed slightly in advance thus tending to anticipate the need for change in braking effect. The condenser 236, by passing high frequency changes in voltage, tends to prevent any erratic effect that might occur as a result of high frequency voltage changes introduced into the system.

When the apparatus is first started up, the pulses 177 will be spaced widely apart due to the relatively slow speed of the drum. Thus when the pulse existing across winding 215 is applied to the rectifier gate, the probability is that the voltage appearing at point 172 will be zero since there will be no trapezoidal pulse present. At the same time, the amplitude of the trapezoidal wave will be relatively small since the amplitude of the pulse is dependent upon the speed with which the magnet 80 passes the head 81. Thus, regardless of what is the phase displacement between the vertical synchronizing signal and the pulses resulting from pulses produced in head 81, the average voltage impressed upon condenser 204 will be relatively small and hence, the braking current supplied to winding 43 will remain relatively small. In this way, it is possible for the drum to come up to speed without being unduly retarded by the braking motor 39.

As the apparatus approaches synchronization, the trapezoidal nature of the wave form appearing at point 192 will enable the synchronization to be completed. While the two sets of pulses are still changing in phase with respect to each other, it will be obvious that the voltage produced across capacitor 204 will be relatively small since sometimes when the pulse existing across winding 215 is applied to the rectifier gate 197, the trapezoidal wave will be at a low point in its cycle, that is, a point between two successive trapezoids so that a zero voltage will be applied to the condenser 204. At other times, the pulse may occur at a point corresponding to a point on the slope or still at other times to a point at the high point of the trapezoid. As a result the average voltage applied to condenser 204 will still be relatively small and hence the braking effect will likewise be relatively small.

Turning now to the case in which the drum and the vertical sync signal are substantially synchronized, the apparatus is so designed that regardless of what will happen the correcting action will not stop until the desired relationship has been obtained, that is, until the pulse occurring across winding 215 occurs at a point part way up the upward slope of the trapezoidal wave form. Let it be assumed that the pulse occurs adjacent a downwardly sloping portion of any particular trapezoidal wave. The resulting braking effect will tend to retard the movement of the drum which will move the pulse further up the downwardly sloping curve to in turn increase the braking effect still further. By the time that the pulse is adjacent the top of the trapezoid, the braking effect will be at its maximum and the drum speed will slow down even more until the gating pulse occurs adjacent the upwardly sloping portion of the trapezoidal wave. When this happens, any braking effect tends to decrease the voltage applied to condenser 204 which in turn tends to decrease the braking effect to speed up the drum. Thus, it is only when the voltage pulse is adjacent the upwardly rising portion of the trapezoidal voltage wave that the apparatus is stabilized.

With this arrangement, it is possible to vary closely control the synchronization of the head position with the incoming video signal. In one actual embodiment, the time represented by the upwardly sloping portion of the trapezoidal wave was 2.2 milliseconds. Thus a relative phase shift of the vertical synchronizing signal and the head signal of as little as two milliseconds is prevented by this apparatus. This is very desirable since it is highly important to the operation of the apparatus that the head 18 cross the edge of the tape at the same point, namely, at the end of one field of the video signal. When the head crosses the gap between the two edges of the tape helically disposed about the drum, it is inevitable that some portion of the signal will be lost. As pointed out above, by insuring that the head always crosses the gap between the two edges of the tape at the time that one field is being completed prior to the time that a new field is started, very little of the actual picture is lost. It is true that the vertical synchronizing signal is lost but as pointed out above, I have provided means for reinserting a vertical synchronizing signal into the reproduced video signal before it is applied to the video output means.

The means for recording the audio signal is shown in substantially the same way in FIGURE 3 as in FIGURE 1. The source of audio signal 89 is connected through a record amplifier to the audio record head 20. The output of the sound bias oscillator 91 is connected through the "record" contact of a changeover switch 243 and condenser 244 to the sound head 20. The purpose of condenser 244 is to offer a relatively low impedance to the output of the bias oscillator 91 and at the same time to block the passage of the relatively lower audio frequency to the erase head 18. It will be noted that the sound bias oscillator is connected directly through the switch 243 to the erase head 18.

The other erase head 19, as previously pointed out, is connected to a direct current source 93. This connection is likewise through a changeover switch 245 which is shown in the record position in which the movable switch member is in engagement with a "record" contact 246. With the switch 245 in this position, the direct current source 93 is directly connected to the erase head 19.

DESCRIPTION OF FIGURE 4

FIGURE 4, like FIGURE 3, shows certain elements in block diagram as they were shown in FIGURE 2. Certain other elements, however, which are shown in block diagram in FIGURE 2 for purposes of simplicity have been shown in circuit form in FIGURE 4 because of the importance which they play in the operation of the apparatus and because of the fact that they have certain novel features of importance as far as the novelty of the present invention is concerned. As has been done previously, the same reference numerals are employed to designate elements corresponding to those which have previously been described in connection with other figures.

As described in connection with FIGURE 2, the signal picked up by the recording and reproducing head 16 is passed through the coupling transformer 64, and the change-over switch 58 to the primary winding 100 of the step-up transformer 101. A resistor 245 is connected across the secondary winding 102 of the transformer 101. The purpose of this resistance is to reduce the Q of the circuit and to reduce the effect of the resonant condition. The signal from transformer 102 is passed through the pre-amplifier 103 to the phase equalizer 104 which will now be described.

The phase equalizer comprises a PNP transistor 247 having a base 248, an emitter 249, and a collector 250. The emitter 249 is connected through a resistor 252 to a conductor 253 leading to a suitable source of positive direct current voltage. In the particular embodiment of the apparatus with which I have been concerned, a source of potential of plus twelve volts was employed. The base 248 to which is connected the output of the pre-amplifier 103 is connected to the junction of two resistors 253 and 254 which are connected between conductor 258 leading to the source of voltage and ground. These two resistors act as a voltage divider to normally maintain base 248 at a desired positive voltage. The signal from the pre-amplifier 103 is effective to vary the potential of base 248 with respect to emitter 249 to vary the conductivity of the transistor. Connected in series with the collector 250 is a further resistor 255. The numeral 256 is used to designate the output terminal of the phase equalizer 104. This terminal 256 is connected to the emitter 249 by a resistor 257 and to the collector by a capacitor 259. The condenser 259 acts as a variable impedance, its impedance depending upon the frequency of the signal. For very high frequency signals, its impedance is relatively low and point 256 is effectively connected to the collector. For very low frequencies, the impedance of condenser 259 is very high so that the impedance of resistor 257 becomes relatively low as compared with that of condenser 259 and point 256 is effectively connected to the emitter 249. When point 256 is connected to the emitter 249, it is, in effect, connected to the positive side of the voltage existing across the emitter collector path, when it is connected to the collector 250, it is connected to the negative point of the emitter collector voltage. Thus, there tends to be a shift approaching 180 degrees in the phase of the output voltage at terminal 256 depending upon whether it is connected to the emitter or collector. As pointed out above, the effective point of connection depends upon the capacitance of condenser 259 which, in turn, depends upon the frequency of the signal being transmitted. The net effect is that the phase equalizer 104 causes the phase to be retarded as the frequency increases. It has been found that there is some tendency in a system of this type for the phase to lead as the frequency of the signals increases. The phase equalizer 104 compensates for this shift in phase which would otherwise occur due to changes in frequency of the signal.

From junction point 256, the signal is supplied to the video amplifier 105 from which it passes into the clamp and blanking unit 106 which will now be described.

The output of the video amplifier 105 first passes through a condenser 262 where it is applied to the base of an NPN transistor 263. Interposed between the base of transistor 263 and ground is a clamping diode 264 which cooperates with the condenser 262 to insure that the tips of the synchronizing pulses do not fall below ground potential. The collector of transistor 263 is connected to conductor 265 leading to a suitable source of positive potential, for example, plus twelve volts. The emitter of transistor 263 is connected through an emitter follower resistor 266 to a conductor 267 leading to a suitable source of negative potential, for example, minus twelve volts. The output of transistor 263 appearing across the resistor 266 is a video signal in which the tips of the synchronizing pulses have been clamped to have a uniform height.

The voltage across resistor 266 is applied to the base of another transistor 270, the emitter of which is connected through a resistor 271 to the conductor 267 leading to the negative source of potential. Similarly, the collector of this transistor 270 is connected to conductor 265 which is maintained at a positive potential. The voltage across resistor 271 is connected through a condenser 272 and conductor 273 to the video output device 107. Before being applied, however, to the video output device, it is subjected to the action of various clamping circuits. In the first place, I provide a clamping means for periodically clamping the video output signal to insure that the potential of the pedestal is at zero. This clamping means will now be described.

The output of the transistor 263 appearing across resistor 266 is not only supplied to the base of transistor 270 but is also connected through a conductor 280 to the input of a sync stripper 281 for extracting the horizontal synchronizing pulses from the video signal. The output of the sync stripper 281 is passed through a one-shot multivibrator 282 to produce a series of square-wave pulses, one for each horizontal synchronizing pulse. Each such pulse is initiated at the end of the horizontal synchronizing pulse or at the "back porch" of the pedestal of the synchronizing pulse. The output of the one-shot multivibrator 282 is then passed through a condenser 283 and a pulse shaping network consisting of a condenser 285 and a resistor 286. The resultant pulses are applied to the base of an NPN transistor 289, the collector of which is connected through a resistor 276 to conductor 265 connected to a positive source of potential and to the cathode of a diode 275. The emitter of transistor 289 is connected to ground at 290. The base is likewise connected to ground by a resistor 291. It will be readily seen that the emitter collector path of transistor 289 is connected in series with diode 275 so that there is a path for the video signal, when the transistor 289 is fully conductive, through the diode 275, the collector and emitter of transistor 289 to ground. The horizontal synchronizing pulses, as modified by the one-shot multivibrator 282 in the pulse shaping network consisting of condenser 285 and resistor 286, are effective each time that one of these pulses is applied to the base of transistor 289 to render the collector emitter path conductive. When this happens, the video output signal is clamped to ground. The phasing of the system is such, as pointed out above, that this occurs during the "back porch" portion of the signal so that the pedestal level is clamped to ground potential.

I also provide means for clamping the tips of the synchronizing pulses to a slightly negative voltage such as minus one volt. Connected between a conductor 297 leading to a suitable source of negative potential, such for example as minus twelve volts, and ground are three resistors 298, 299, and 300. These three resistors act as a voltage divider being connected at one end to the negative conductor at minus twelve volts and at the other end to ground. The value of the resistors is so chosen that the junction of resistors 298 and 299 is at a potential of minus 2½ volts in the example mentioned, and the junction of resistors 299 and 300 is at a voltage of minus one, both voltages being approximate. Condenser 295 is connected across resistor 300 and condenser 296 across resistors 299 and 300 to by-pass any high frequency voltage components that might be present in the voltage applied across resistors 298, 299, and 300. The junction of resistors 299 and 300 is connected through a conductor 301, diode 302, and conductors 303, 304, and 273 to the video output 107. The diode 302 acts in conjunction with condenser 272 to provide a clamping effect in that the tips of the synchronizing pulses can never go below the potential between the junction of resistor 299 and 300, which in the example given is approximately minus one volt.

It will thus be seen that as a result of the combined action of the two clamping means described that the peaks of the synchronizing pulses are always clamped, in the example mentioned, to minus one volt so that they cannot exceed that potential in the negative direction. This is because of the clamping connection provided by diode 302. Due to the action of the clamping action provided by diode 275 and transistor 289, the signal is further clamped at the pedestal level to ground potential. The latter clamping action occurs at the beginning of each trace just as the signal passes through the "back porch" portion of the signal. Because of this dual clamping action occurring at the end of each horizontal trace, any low frequency components which may have been lost due to the recording limitations of the head at the relatively low recording speeds at which my apparatus operates, are recovered. Because of the fact that such low speed signal variations are recovered in this manner, it is possible in my apparatus to employ straight recording of the video signal as distinguished from the use of the signal to frequency modulate a high frequency voltage as is done in many systems of this type employing relatively low recording and reproducing speeds.

It was also noted above that I have provided means for restoring the vertical synchronizing signal that is lost at the end of each field when the head 16 is passing over the gap between the two edges of the tape. The means for doing this will now be described.

The head 81 associated with the magnet 80 for measuring drum speed has, as previously pointed out, a pulse produced therein for each revolution of the drum. This series of pulses is applied to the amplifier 82 and from there to the one-shot multivibrator 175 as described in connection with FIGURE 3. The output of this one-shot multivibrator is supplied to the clamp and blanking unit 106, being passed through a pulse shaping network consisting of a resistor 305 and a condenser 306. The output of the pulse shaping network is passed through a blocking condenser 307 to the base of an NPN transistor 310, the base of which is further connected to the emitter by a resistor 311. The collector of transistor 310 is connected through a resistor 312 and a conductor 313 to the conductor 265 leading to a positive source of potential. This transistor serves to periodically clamp the video signal being supplied to the video output 107 to a voltage value such that no video signal can pass.

It will be noted that a circuit can be traced from the video output 107 through conductors 273, 304, a diode 315, the collector and emitter of transistor 310 and conductor 316 to the junction of resistors 298 and 299 of the voltage divider. This junction, as previously pointed out, is at a potential of approximately minus 2½ volts. When the transisor 310 is rendered conductive as the result of the pulse being applied from head 81 through the amplifier 82 and the multivibrator 175, the video output is effectively connected to this junction between resistors 298 and 299. In actual practice, the potential to which the video output is connected is substantially higher than minus 2½ volts due to the voltage drops through the diode 315 and the transistor 310. Thus, at the time the transistor 310 is rendered conductive, the video output is actually reduced to a potential of approximately minus one volt, which is the same as that to which the tips of the horizontal synchronous pulses were clamped, due to the connection from the junction of resistors 299 and 300 through diode 302 to the video output.

As a result of transistor 310 periodically being rendered conductive and the video output being clamped to a voltage of approximately minus one volt, the entire video signal is brought into the black range which starts at approximately zero volts. At this stage in the apparatus, the normal video signal is positive. Hence, no picture information is transmitted to the video output device at the time that transistor 310 is conductive. There are several purposes to this. In the first place, as has been pointed out previously, the signal along the edges of the tape 10 was erased during the recording operation and the audio signal recorded along one edge and the synchronizing control signal along the other edge. These two signals, if scanned by the main head 16 and transmitted through to the video output 107, would create a disturbing effect since they have no significance as far as the picture information is concerned. By blanking out the signal to the video output at a time corresponding to the time when the head passes the edges of the tape, it is assured that any signal picked up by the head when it passes the edges of the tape will not be transmitted to the video output. At the same time, a sudden change in the signal supply to the video output due to the signal being suddenly moved to a potential of minus one volt in the black range creates a pulse in the signal supplied to the video output, which pulse is properly timed and of a character to act as a vertical synchronizing pulse. The one-shot multivibrator 175 is designed to produce a pulse which is of a different order of magnitude than the horizontal synchronizing pulse. A typical horizontal synchronizing pulse has a duration of only a few microseconds, whereas the pulse supplied by the multivibrator 175 has a length of about 2.6 milliseconds. This pulse is comparable in length to the typical vertical synchronizing pulse so that as far as the video output apparatus is concerned, the reduction of the video output signal to the minus one volt value for this period of time creates an effect similar to that of a typical vertical synchronizing signal. In this way, with my apparatus, the vertical synchronizing signal which must of necessity be lost in the recording operation, is effectively replaced.

The means for controlling the speed of the drum 15 will now be discussed. As pointed out in connection with FIGURE 2, the signal from the head 21 which reproduces the control signal recorded along one edge of the tape is amplified by an amplifier 113 and compared with the signal from the head 81 to control the operation of the braking motor 39 to maintain a drum speed at a desired value with respect to the tape speed. The operation of the comparator 79, the lead network and amplifier 85, and the braking motor 39 are exactly the same as during the recording operation and need not again be described. The means, however, for amplifying the signal from head 21 will, however, be discussed.

The signal from head 21 first passes through switch 169 which is now in the playback position so that switch 170 is in contact with the "playback" contact 171. From contact 171, the signal passes through a blocking condenser 320 to the input of amplifier 113. The amplifier 113 has three PNP transistors 321, 322, and 323, each having the usual base, emitter and collector. The collectors are all connected to a conductor 325 leading to a suitable source of negative potential, for example, minus twelve volts. Connected between the collector of transistor 321 and conductor 325 is a resistance 326. Similar resistors 327 and 328 are connected between the collectors of transistors 322 and 323, respectively and conductor 325. A resistor 329 and a condenser 330 are connected between the base and the collector of transistor 321. The condenser 330 is provided for limiting the high frequency response of the amplifier to reduce the effect of extraneous high frequency disturbances. The output of transistor 321 is connected through a blocking condenser 331 to the base of the second transistor 322. A resistor 332 and a condenser 334 are connected between the base of transistor 322 and its collector. The function of condenser 334 is similar to that of condenser 330, namely to limit the response of the amplifier to extraneous high frequency disturbances. The output of transistor 322 is connected through a condenser 336 to the base of a final transistor 323. The emitters of all three transistors 321, 322, and 323 are connected to a ground conductor 337, connected to ground at 338. The connection of the emitter of transistor 321 to ground includes a resistor 339 to reduce the gain at that stage.

Interposed between the base of the last transistor 323 and ground conductor 337 are a resistor 340 and a diode 341. The diode 341 is provided for the purpose of clamping the input of the base to ground to insure that the signal supply to the base of transistor 323 cannot use above ground potential. In this way, it is assured that the signal supplied to transistor 323 will always be below ground potential and that the pulses supplied to the base of that transistor will be sufficiently negative to drive the transistor to saturation.

The output of transistor 323, which constitutes the output of amplifier 113, is then supplied to the comparator 79 where it is compared with the signal from the one-shot multivibrator 175 which, in turn, is dependent upon the signal generated by head 81. As has been described in connection with both FIGURES 2 and 3, the pulse from the head 81, dependent upon the speed of the rotation of drum 15, is compared with the signal from the output of amplifier 113 which is dependent upon the speed of the tape. The output of the comparator then passes through a lead network and amplifier 85 to control the energization of winding 43 to control the braking effect of winding 39. As has been described in detail in connection with FIGURE 3, this is then employed to maintain the relative speeds of the drum 15 and the motor 23 (shown in FIGURE 1) driving the tape at such a value that the head 16 will always pass the edges of the tape at the end of a video field.

As has been also pointed out previously, it will be noted that the signal produced in head 81 by rotation of the drum 15 is used for three distinct purposes, one, to blank out the video output signal to remove any effects of the audio signal and the control signal from the video signal. The next effect is to insert in the video output signal a pulse which is capable of being employed as a vertical synchronizing signal. Lastly, the same pulse produced by head 81 is employed to control the speed with which the head is driven with respect to the longitudinal speed of the tape.

The apparatus for reproducing the sound is shown in the same manner as in FIGURE 2 and need not be repeated here. The output of the head 20 is connected through amplifier 108 to the audio output device 109. It will be noted that the two erase heads 18 and 19 are effectively disconnected since changeover switches 243 and 245 are in their "playback" positions in which the movable switch contact of each of these switches is in engagement with a "playback" contact which is effectively "dead." It is obvious that no erasing action is desired during the reproducing or playback portion of the operation.

In the foregoing description, reference has been made only occasionally to the values of the components. It is to be understood that these components may have various values within the scope of the invention. In one particular embodiment of the invention, the following components were employed. In this same embodiment, the voltages employed were those which have been referred to above. It is to be understood that the values and components named are illustrative only and that the scope of the invention is not to be construed as limited to the values or particular components named.

Transistors:

| | |
|---|---|
| 115 | 2N1309 |
| 116 | 2N1308 |
| 155 | 2N1304 |
| 179, 190 | 2N1305 |
| 211 | 2N1304 |
| 227, 228 | 2N1305 |
| 231 | 2N1304 |
| 240 | 2N1305 |
| 241 | 2N301 |
| 247 | 2N1309 |
| 263, 270 | 2N2712 |
| 289, 310 | 2N1304 |
| 321, 322, 323 | 2N1305 |

Inductors:

| | | |
|---|---|---|
| 141 | millihenries | 40 |
| 146 | microhenries | 10 |

Diodes:

| | |
|---|---|
| 164, 186 | IN270 |
| 199, 200, 201, 202, 218 and 220 | IN458A |
| 264, 275 | IN3067 |
| 302, 315, 341 | IN270 |

Condensers:

| | | |
|---|---|---|
| 129 | microfarads | 20 |
| 139 | picofarads | 72 |
| 147 | do | 60–68 |
| 166 | microfarads | 5 |
| 182, 204 | microfarad | .25 |
| 209 | picofarads | 4700 |
| 223 | microfarad | 1 |
| 233 | microfarads | 5 |
| 236 | microfarad | .25 |
| 259 | picofarads | 200 |
| 262 | microfarad | .01 |
| 272 | do | .05 |
| 283 | do | .1 |
| 285 | picofarads | 270 |
| 295 | microfarad | 1 |
| 296 | do | 1 |
| 305 | picofarads | 270 |
| 307 | microfarads | 5 |
| 320, 331 | do | 10 |
| 330, 334 | picofarads | 200 |
| 336 | microfarads | 5 |

Resistors:

| | | |
|---|---|---|
| 128 | kilohms | 10 |
| 130, 133 | ohms | 39 |
| 137 | kilohms | 1.5 |
| 138 | ohms | 470 |
| 140 | do | 820 |
| 150 | kilohm | 1 |
| 159 | kilohms | 1.5 |
| 161 | ohms | 47 |
| 163 | kilohms | 47 |
| 183, 196 | kilohm | 1 |
| 207 | kilohms | 12 |
| 216 | ohms | 22 |
| 222 | kilohms | 330 |
| 230 | do | 2.7 |
| 232 | do | 47 |
| 235 | do | 4.7 |
| 237 | ohms | 390 |
| 245 | kilohms | 10 |
| 252 | ohms | 270 |
| 253 | kilohms | 4.7 |
| 254 | do | 15 |
| 255 | ohms | 390 |
| 257 | kilohms | 1.5 |
| 266, 271, 276 | do | 2.2 |
| 286 | do | 4.7 |
| 291 | kilohm | 1 |
| 298 | ohms | 330 |
| 299 | do | 82 |
| 300 | do | 33 |
| 306 | kilohms | 4.7 |
| 311 | kilohm | 1 |
| 312 | kilohms | 2.2 |
| 326 | do | 10 |
| 327 | kilohm | 1 |
| 328 | kilohms | 2.2 |
| 329 | megohm | 1 |
| 332 | kilohms | 100 |
| 339 | ohms | 100 |
| 340 | kilohms | 47 |

DESCRIPTION OF FIGURES 5, 6 AND 7

In the foregoing description, the drum 15 has been merely described as containing a head 16 and a coupling transformer 64. In actual practice, I have found it desirable to provide certain expedients to bring the tape into better contact with the head 16. In order to show this, I have shown certain details of the drum in FIGURES 5, 6 and 7, which details are not shown in the schematic FIGURES 1 to 4.

In the first place, the head 16 is mounted on an insert plate 350 which may be held in position in the drum by a plurality of fastening means 351, such as screws. Extending closely adjacent to the head 16 are two slots 353 and 354. These slots extend very closely to the head and extend past it in both directions into the main body of the drum. The slots moreover vary both in depth and width. At their maximum depth, adjacent the center of head 16, these slots are .020 inch in depth. They taper in both directions to a zero width and depth.

The slots 353 and 354 are provided for the purpose of bringing the tape into closer engagement with the head 16. In order to prevent wear on the tape, the head is substantially flush with the surface of the drum, projecting only one thousandth of an inch or so from the surface of the drum. Since the drum revolves at a relatively high speed, producing an air cushion between the tape and the drum, there is some tendency for the tape to be separated from the drum. This, of course, tends to impair both the recording and reproducing functions. The slots 353 and 354 tend to bring the tape into closer contact with the head 16 since these slots create a depression on either side of the head 16. By providing these slots, it is accordingly possible to have the head project much less from the surface of the drum than would otherwise be the case.

Figure 8:
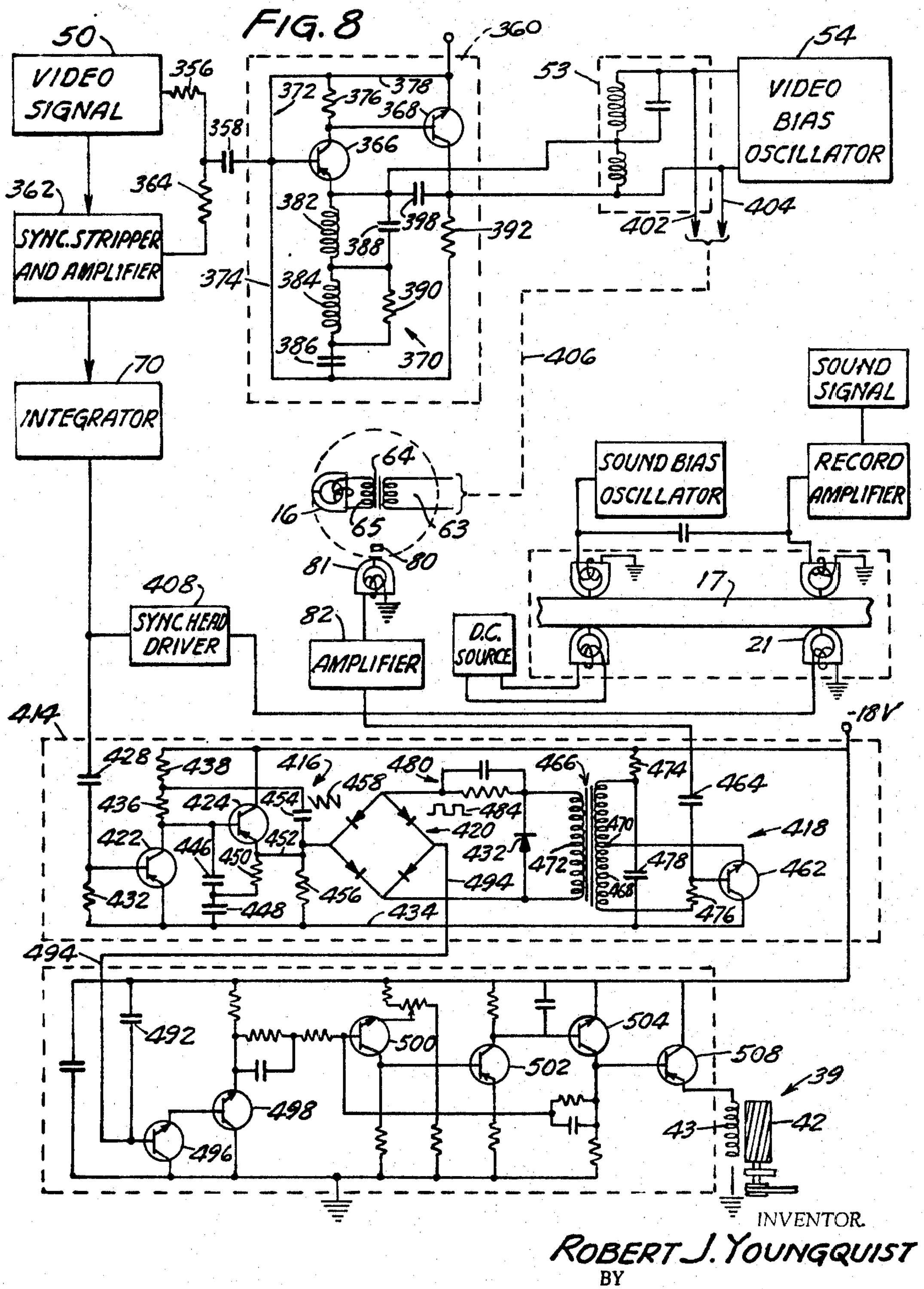
FIGURE 8 is a schematic diagram, partially in block form, illustrating another embodiment of a recording system utilizing the comparator in a different arrangement than that of FIGURE 3.

Considering now the recording system of FIGURE 8, the alternate embodiment thereof differs in several respects from that of FIGURE 3. In the embodiment of FIGURE 8, video signal source 50 applies video signals via a resistor 356 and a coupling capacitor 358 to an amplifier pre-emphasis stage 360 and a synchronizing stripper and amplifier 362. The synchronizing stripper and amplifier 362 strips synchronizing signals from the video signals and amplifies the signals to a desired level. Thereafter, the amplified synchronizing signals are applied via a resistor 364 and the coupling capacitor 358 to the amplifier pre-emphasis stage 360.

The amplifier pre-emphasis stage 360 comprises a video amplifier, including two transistors 366 and 368, and a pre-emphasis network 370. The video amplifier further includes resistors 372 and 374 which establish an operating level for transistor 366. The collector of transistor 366 is connected via a load resistor 376 to a source of negative potential 378, for example −18 volts, and the emitter is connected to a ground conductor 380 through pre-emphasis network 370. Pre-emphasis network 370 includes two inductors 382 and 384 and a capacitor 386 connected in series circuit relationship. Additionally a second capacitor 388 is connected in parallel with inductor 382 and a second resistor 390 is connected in series with the capacitor 388 and in parallel with inductor 384. The collector of transistor 366 is connected directly to the base of transistor 368. The emitter of transistor 368 is connected to the source of negative potential 378 while the collector thereof is connected to ground conductor 380 via resistor 392. A negative feedback circuit is provided between the collector of transistor 368 and the emitter of transistor 366. This negative feedback circuit includes a coupling capacitor 398 and the transducing head 16 which is operatively connected in parallel to capacitor 398 via the bias trap 53.

The amount of negative feedback from transistor 368 to transistor 366 is a function of the impedance of the pre-emphasis network 370 which varies in response to the frequency of the video signals. At relatively low frequencies, the negative feedback circuit impedance is relatively low resulting in relatively little feedback such that relatively high level recording signals are applied to the transducing head 16. At intermediate frequencies, the negative feedback circuit impedance increases relative to its impedance at low frequencies resulting in increased negative feedback such that lower level recording signals are applied to the transducing head 16. At the higher frequencies, the negative feedback circuit impedance increases substantially compared to its impedance at either low or intermediate frequencies such that the low level recording signals are applied to the transducing head 16.

The amplified and pre-emphasized video signals are superimposed upon and added to a video biasing signal produced by the video bias oscillator 54. Bias trap 53 prevents the video biasing signals from passing into the amplifier pre-emphasis stage 360. The video signals, in the form of recording signals, are applied via conductors 402 and 404 and transformer 64 to transducing head 16. Dashed line 406 illustrates an electrical connection between conductors 402 and 404 and primary winding 63 of transformer 64, which transformer 64 supplies recording signals via secondary winding 65 to transducing head 16.

Referring now to the electrical circuitry for controlling the speed of the head 16, the synchronizing stripper and amplifier 362 also applies amplified synchronizing signals to the integrator 70. Integrator 70 applies a control signal derived from the vertical synchronizing signal to a sync head driver 408 and to a comparator 414. Sync head driver 408 illustrated in block form includes the sync pulse amplifier 73 and sync head driver 74 of FIGURE 3. Sync head driver 408 produces and applies an amplified synchronizing signal or control signal to synchronizing head 21. Head 21 records the control signal on one edge of the recording medium or tape 17.

In addition to the control signal from integrator 70, comparator 414 receives a head position pulse from head 81 via amplifier 82 in the same manner as described in FIGURE 3. The operational features of the comparator 414 of FIGURE 8 differs from comparator 79 of FIGURE 3 in two important ways. The control signals applied to comparator 414 comprise an input signal to a ramp generator circuit designated as 416 which produces a sawtooth wave or series of spaced varying voltage pulses the amplitude of each of which steadily changes during at least a portion of the pulse duration. The head position pulses applied to comparator 414 comprise an input signal to a blocking oscillator circuit designated generally as 418. The phase relation between the control signal and head position pulse is determined by a diode gate 420.

Considering the schematic diagram of the comparator 414, the ramp generator circuit 416 includes PNP transistors 422 and 424. The control signals derived from the high frequency or video signals are received from integrator 70 and applied via a coupling capacitor 428 to the base of transistor 422. A resistor 432, connected between the base of transistor 422 and ground conductor 434, establishes the operating level of transistor 422 such that in the absence of a control signal transistor 422 is nonconductive. The emitter of transistor 422 is connected directly to the ground conductor 434. The collector of transistor 422 is connected via resistor 436 and resistor 438 to a source of negative potential 440. Additionally the emitter of transistor 422 is connected to ground conductor 434 via capacitors 446 and 448 and to the base of transistor 424. The emitter of transistor 424 is connected via a resistor 450 to a common junction terminal between the capacitors 446 and 448. The collector of transistor 424 is connected directly to a source of negative potential 440. Since the base of transistor 424 is connected directly to the collector of transistor 422, transistor 424 will be conductive when transistor 422 is nonconductive due to the negative potential which is applied to the base thereof from the source of negative potential 440. An output conductor 452 from the ramp generator 416, which conductor 452 is connected to the emitter of transistor 424, applies the varying voltage pulses to diode gate 420. A filter capacitor 454 is connected between the common junction terminal of resistors 436 and 438 and the input to diode gate 420, which input is connected to ground conductor 434 via a resistor 456.

Prior to integrator 70 applying the control signal to the base of transistor 422, transistor 422 is nonconductive and transistor 424 is conductive. Capacitors 446 and 448 are charged via resistors 436 and 438 from the negative source of potential 440. When a control signal is applied to the base of transistor 422, transistor 422 immediately becomes conductive to abruptly discharge capacitor 446 through its low impedance collector-emitter junction to ground conductor 434. As the potential applied to the base and emitter of transistor 424 becomes less negative, transistor 424 becomes nonconductive but at a rate such that the discharge curve of the capacitors 446 and 448 is linearized resulting in a sawtooth wave having a linear ramp portion. At the end of the control signal, transistor 422 is again rendered nonconductive while transistor 424 is rendered conductive. Capacitors 446 and 448 are recharged by the source of negative potential 440. The resultant varying voltage pulses applied to the diode gate 420 are illustrated as waveform 458.

Considering now the blocking oscillator 418, the oscillator includes a transistor 462 which is adapted to receive a head position pulse from amplifier 82 via a coupling capacitor 464. The transistor 462 is operatively coupled to a feedback transformer 466, which transformer includes a primary winding 468, having a center tap 470, and a secondary winding 472. One end of the primary winding 468 is connected via a resistor 474 to the source of negative potential 440 while the other end of winding 468 is connected via a resistor 476 to the base of transistor 462. The emitter of transistor 462 is connected to the center tap 470 and the collector of transistor 462 is connected directly to the ground conductor 434. A bypass capacitor 478 is connected between resistor 474 and ground conductor 434. Secondary winding 472 is connected across diode gate 420 with a coupling network 480 connected between one end of the secondary winding 472 and the gate 420. A diode 482 is connected across the secondary winding 472 to minimize transient voltages produced by the inductance of the transformer 466 during switching of transistor 462.

The head position pulse produced by head 81 is amplified by amplifier 82 and applied via capacitor 464 to the base of transistor 462. Transistor 462 is driven into conduction by each head position pulse to produce a uniform voltage across secondary winding 472 due to current through primary winding 468 when transistor 462 is conductive. Thus, the blocking oscillator 418 is responsive to a series of head position pulses to produce a series of spaced uniform voltage pulses the amplitude of each of which remains substantially constant during at least a portion of the pulse duration. The uniform pulses are applied to the diode gate 420 via the coupling network 480. The output from the blocking oscillator 418 is illustrated as waveform 484.

The pulses from the ramp generator 416 and the blocking oscillator 418 are applied to diode gate 420 of the comparator 414. Diode gate 420 produces a resultant signal or voltage signal the magnitude of which is dependent on the phase relation between the voltage pulses. The operation of diode gate 420 is similar to that of diode gate 197 as described in FIGURE 3 and the operation thereof need not be repeated. The output from diode gate 420 is applied to a lead network and amplifier 490. The voltage signal produced by the diode gate 420 is applied to the lead network and amplifier 490 via conductor 494 and the voltage signal is stored within a capacitor 492.

Considering now the operation of the lead network and amplifier 490, transistors 496 and 498 function to amplify the voltage signal applied to capacitor 492 and the base of transistor 496. The other transistors 500, 502 and 504 operate as a stable, linear D.C. amplifier having a negative feedback loop for stability. The D.C. amplifier portion of the lead network and amplifier 490 produces a braking signal which is applied to a power transistor 508. The power transistor 508 produces a braking voltage from the source of negative potential 440 which controls the grounded braking winding 43 to regulate the speed of rotor 42 of braking motor 39 and subsequently the speed of rotation of head 16. The braking voltage is continually applied to braking winding 43 by the lead network and amplifier 490 to keep the speed of rotation of head 16 in synchronism with the oblique tracks across the recording medium 17.

Figure 9:
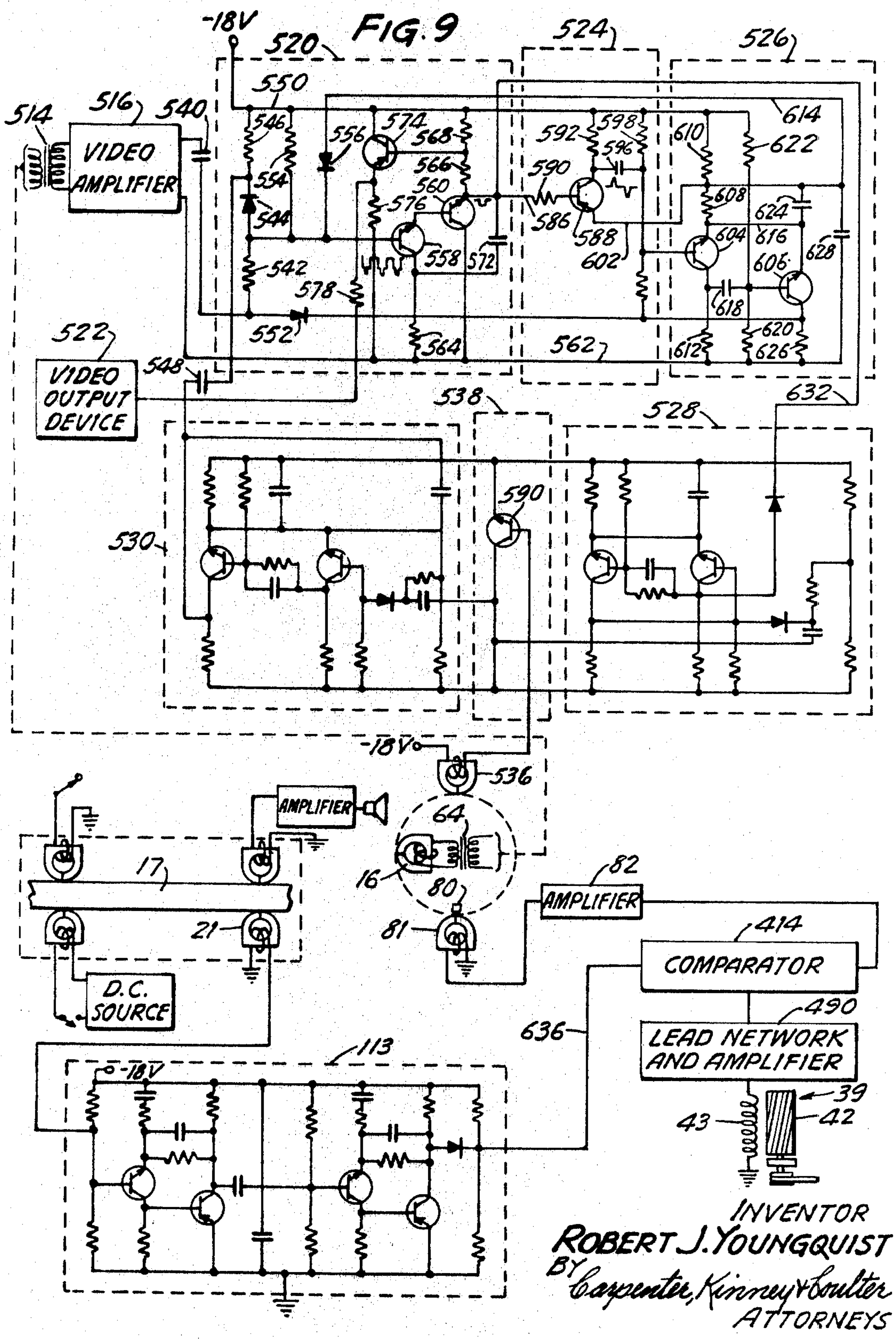
FIGURE 9 is a schematic diagram, partially in block form, illustrating another embodiment of a reproducing system utilizing another clamping circuit.

FIGURE 9 is an alternate embodiment of a reproducing or playback system wherein the low frequency component and the erased vertical synchronizing signal are replaced by various clamping circuits. The recorded video signals are contained within oblique tracks located between two spaced tracks recorded one on each longitudinal edge of the recording medium. The recorded video signals are reproduced from the oblique tracks by transducing head 16. Transducing head 16 applies the reproduced video signals through transformers 64 and 514 to a video amplifier 516. The video amplifier 516 amplifies and applies the reproduced signal to a clamp and blanking unit 520. The clamp and blanking unit 520 applies a composite video signal, having appropriate synchronizing and blanking signals, to a video output device 522.

The clamp and blanking unit 520, during reproduction of the video signal, is controlled by a synchronizing signal stripper 524. The synchronizing stripper 524 functions to remove horizontal synchronizing signals from the video signal received from video amplifier 516. Additionally, the synchronizing signal stripper 524 controls operation of a back porch monostable multivibrator 526 in response to the trailing edge of the horizontal synchronizing signal. The function of multivibrator 526 is to fix the back porch duration or the time interval between the trailing edge of the horizontal synchronizing signal and the trailing edge of the horizontal blanking signal.

The clamp and blanking unit 520, during the interval when head 16 crosses over the recording medium edges, accomplishes vertical blanking and synchronizing under control of a vertical synchronizing signal monostable multivibrator 528 and a vertical blanking signal monostable multivibrator 530.

During playback, the position of the transducing head 16 is determined by head 81 in response to magnet 80 in a manner similar to that of the playback system of FIGURE 4. However, in this embodiment, a second head or clamp pulse head 536 is disposed a predetermined angular distance from the first head 81, which in this embodiment is 180° to place the second head in radial alignment with the first head. Both heads 80 and 536 are responsive to magnet 81 being passed thereby and the time interval between pulses is a function of the speed of rotation of head 16. The angular displacement distance of clamp pulse head 536 is dependent on the timing required between the vertical blanking signal, the vertical synchronizing signal and the time required for transducing head 16 to cross the longitudinal edge of the tape containing the recorded synchronizing signals and audio signals. The reproduced video signal supplied to the video output device 522 contains the appropriate synchronizing and blanking signals.

Considering the schematic diagram of the clamp and blanking unit 520, a coupling capacitor 540 is connected between the video amplifier 516 and a resistor-diode clamping matrix. The capacitor 540 is connected to one end of a resistor 542, the other end of resistor 542 being connected to the anode of a diode 544. The cathode of diode 544 is electrically connected via a resistor 546 to a source of negative potential 550, for example a negative 18 volts. A capacitor 548 connects the common junction terminal between the cathode of diode 544 and resistor 546 to the vertical synchronizing monostable multivibrator 530.

The end of resistor 542 connected to diode 544 is also electrically connected to the anode of a second diode 522. The cathode of diode 552 is connected to the multivibrator 526. A resistor 554 is connected between the source of negative potential 550 and the anode of diode 544 in parallel with diode 544 and resistor 546. A third diode 556 has its cathode connected to the common junction terminal between resistor 554, the anode of diode 544 and resistor 542 and the anode of diode 556 is connected to the multivibrator 526.

A pair of transistors 558 and 560 are connected in a Darlington amplifier arrangement with the base of transistor 558 being electrically connected to the common junction terminal between the cathode of diode 556, resistor 554, the anode of diode 544 and resistor 542. The collector of transistor 558 is electrically connected to a ground conductor 562 via a resistor 564 while the emitter of transistor 558 is connected to the base of second transistor 560 of the Darlington pair. The emitter of transistor 560 is electrically connected to the source of negative potential 550 via resistors 566 and 568. The collector of transistor 560 is connected directly to the ground conductor 562. Also the emitter of transistor 560 is connected via a capacitor 572 to the collector of transistor 558.

A transistor 574 connected as an emitter follower has its base connected to the common junction terminal between resistors 566 and 568 while the collector thereof is directly connected to the source of negative potential 550. The emitter of transistor 574 is electrically connected to the ground conductor 562 via a resistor 576. A resistor 578 operatively couples an output conductor 580 to the emitter of transistor 574. Conductor 580 applies the resulting composite video signal to the video output device 522.

An output conductor 586 connects the clamp and blanking unit 520 to the synchronizing signal stripper 524. The synchronizing signal stripper 524 comprises a single transistor 588, the base of which is connected to conductor 586 via resistor 590. The collector of transistor 588 is electrically connected to the source of negative potential 550 via a resistor 592. The collector of transistor 588 is also connected via a capacitor 596 to a voltage dividing network comprising resistors 598 and 600. The synchronizing signal stripper 524 has an output conductor 602 electrically connected between the emitter thereof and the back porch monostable multivibrator 526.

The multivibrator 526 comprises two transistors 604 and 606. The base of transistor 604 is electrically connected to the synchronizing signal stripper 524 at the common junction terminal between resistors 598 and 600. The emitter of transistor 604 is electrically connected through resistors 608 and 610 to the source of negative potential 550. The emitter of transistor 588 of the synchronizing signal stripper 524 is electrically connected via conductor 602 to the common junction terminal between resistors 608 and 610. The collector of transistor 604 is connected to ground conductor 562 via a resistor 612. The resistors 598 and 600 of the synchronizing signal stripper 524 establish the operating level of transistor 604. In the absence of a pulse from the synchronizing signal stripper 524, the transistor 604 is normally conductive due to the potential impressed upon the base thereof by the voltage dividing resistors 598 and 600. Resultantly, transistor 606 will normally be nonconductive. Conversely, when transistor 604 is rendered nonconductive due to a negative going pulse, transistor 606 immediately becomes conductive. As will be described, when transistor 604 is conductive, the potential at the emitter of transistor 604 will be utilized to clamp the video signal at the black level. Conversely, when transistor 606 is conductive, the voltage across resistor 610 or the potential at the common junction of resistors 608 and 610 will be utilized to clamp the video signal at the blacker-than-black level. A conductor 614 is also connected to the common junction terminal between resistors 608 and 610 and applies the voltage appearing thereacross to the anode of diode 556 in the clamp and blanking unit 520.

The emitter of transistor 604 is also connected via conductor 616 to the emitter of the second transistor 606 while the base of transistor 606 is electrically connected to a common junction terminal between voltage dividing resistors 620 and 622. A capacitor 618 is connected between the same common junction terminal and the collector of transistor 604. The voltage dividing resistors 620 and 622 extend between the source of negative potential 550 and ground conductor 562 and establish the operating level of transistor 606. A capacitor 624 connects the emitter of transistor 606 to conductor 614. The collector of transistor 606 is electrically connected to ground conductor 562 via resistor 626. A capacitor 628 is electrically connected between conductor 614 and ground conductor 562.

The multivibrators 528 and 530 are conventional monostable multivibrators utilizing diode steering and collector switching. Thus, the multivibrators 528 and 530 are illustrated schematically but the electrical connections thereof need not be recited in detail since the electrical connections and operations thereof are well known in the art.

The operation of the clamp and blanking unit 520 during a vertical field or half frame will now be considered. In one embodiment, the black level for the video signal was about −11 volts and the blacker-than-black level was about −13 volts. Thus, the picture information was represented by voltages more positive than −11 volts up to about −6 volts.

The transducer head 16 reproduces the recorded video signals having horizontal synchronizing and blanking signals from the oblique tracks of the recording medium 17 and applies the same to the video amplifier 516. Amplifier 516 applies the amplified reproduced video signals to the clamp and blanking unit 520. The cathode of diode 544 is electrically connected to ground via capacitor 548 and multivibrator 530 while the cathode of diode 552 is electrically connected to ground conductor 562 via resistor 626.

The amplified reproduced video signals are applied to the base of transistor 558 via capacitor 540. Since the cathodes of diodes 544 and 552 are connected to ground, the video signals, which are more negative than ground potential, back bias diodes 544 and 552. Transistors 558 and 560 amplify and apply the video signals via transistor 574, resistor 578 and conductor 580 to the video output device 522.

However, the anode of diode 556 is electrically connected via conductor 614 to the common junction terminal between resistor 608 and resistor 610. Since transistor 604 is normally conductive and transistor 606 is normally nonconductive, the anode of diode 556 is biased at the potential of the common junction terminal between resistors 608 and 610. The potential at this common junction terminal is selected to be the blacker-than-black level. Thus diode 556, being biased at the blacker-than-black level, permits all the video signals to be passed except that diode 556 clamps the horizontal synchronizing signal tip at the blacker-than-black level.

When the horizontal blanking and synchronizing signal portion of the video signals are applied to the Darlington pair 558 and 560, the transistors 558 and 560 become non-conductive and transistor 588 of the synchronizing signal stripper 524 is driven into conduction. Capacitor 596 differentiates the leading and trailing edge of the horizontal synchronizing signal. The negative going portion, or trailing edge, of the horizontal synchronizing pulse drives transistor 604 of the multivibrator 526 into cut-off or nonconduction. Immediately transistor 606 of the monostable multivibrator 526 becomes conductive and remains in its unstable state for a time period equal to the RC time constant of resistor 622 and capacitor 618. This time period is equal to about 3 microseconds or the back porch period. The back porch clamping time period is meant to be the time interval of the horizontal blanking signal between the trailing edge of the horizontal synchronizing signal and the trailing edge of the horizontal blanking signal.

When transistor 604 is conductive, the current through resistors 608, 610 and 612 and the emitter-collector junction of transistor 604 produces a predetermined voltage drop across resistor 608. In this embodiment, the resistance of resistor 626 is selected to be equal to that of resistor 612. Therefore, when transistor 606 is conductive due to multivibrator 526 being triggered, the current through resistors 608, 610 and 626 and the emitter-collector junction of transistor 606 produces a voltage drop across resistor 608 which is substantially equal to that produced thereacross when transistor 604 was conductive. Thus, when either transistor 604 or transistor 606 is conductive, the anode of diode 556 connected to the common junction terminal between resistors 608 and 610 via conductor 614, is always biased at the blacker-than-black level.

When transistor 606 is conductive, the potential at the collector of transistor 606 is at the same potential as that of the emitter of transistor 604, or the black level, due to the resistance of resistor 612 being equal to that of resistor 626. The cathode of diode 552 is biased at the black level as long as transistor 606 remains conductive. The potential applied to the cathode of diode 552 is at the black level and any charge on capacitor 540 more positive than the black level causes diode 552 to become forward biased. Capacitor 540 discharges through diode 552 until the charge on capacitor 540 and the potential of the anode of diode 552 reach the potential of the cathode of diode 552. The clamping of the potential on capacitor 540 at the black level before the end of the horizontal blanking signal insures that the following picture signal will be referenced to the black level.

Concurrently, the base of transistor 568 is clamped at the black level by diode 552. At the end of the back porch clamping interval, multivibrator 526 reverts back to its stable state wherein transistor 604 is again conductive and transistor 606 nonconductive.

In summary, when the transducing head 16 reproduces the recorded video signal from the oblique tracks, the reproduced video signal contains the horizontal synchronizing and blanking signal in proper sequence relative to the picture signal. The clamp and blanking unit 520, the synchronizing signal stripper 524 and the multivibrator 526 function to clamp the back porch portion of the blanking signal at the black level, such that the following picture signal is referenced to the black level. Additionally, the blacker-than-black level for the horizontal synchronizing signal is established by a clamping diode such that a following horizontal synchronizing signal will have the tip thereof clamped at the blacker-than-black level. Further, the back porch time is selected to be of sufficient time duration such that the appropriate black level is reestablished for the subsequent picture signal corresponding to the next horizontal scan line.

As the reproduced video signal reaches the end of a field or one-half frame, transducing head 16 crosses over and reproduces the signals recorded along the longitudinal edge of the recording medium. As the head 16 approaches the edge of the recording medium, it is necessary that a blanking signal be generated to insure that the reproduced signal is not passed or transmitted to the video output device 522. The clamping pulse head 536 produces a clamping pulse in response to magnet 80 being passed thereby. The clamping pulse is amplified by amplifier 538 and applied to the multivibrators 528 and 530 to produce the vertical blanking and vertical synchronizing signals in proper sequence.

The pulse amplifier 538 comprises a single transistor 590 which simultaneously triggers both multivibrators 528 and 530 in response to the clamping pulse from head 536.

Multivibrator 530, when triggered, clamps the cathode of diode 544 and the base of transistor 558 at the blacker-than-black level. The multivibrator 530 remains in its unstable state for a time interval substantially equal to a vertical synchronizing signal interval, which interval is about equal to the time required for transducing head 16 to cross over the longitudinal edges of the recording medium 17. Concurrently, multivibrator 528, when triggered, applies a potential substantially equal to the black level via conductor 632 to the emitter of transistor 560. Since the base of transistor 558 is clamped at the blacker-than-black level via diode 544, transistors 558 and 560 of the Darlington pair remain in the nonconductive state. However, the voltage applied to the emitter of transistor 560 produces a voltage drop across resistors 566 and 568 such that the potential of the base of the transistor 574 is at a potential substantially equal to that of he black level. Transistor 574, via resistor 578 and conductor 580, applies a vertical blanking signal at the black level to the video output device 522 until multivibrator 528 resets.

Multivibrator 528 remains in its unstable state for a time interval approximately equal to the time required between the leading edge of the vertical blanking signal and the leading edge of the vertical synchronizing signal. In one embodiment, the time interval was selected to be approximately 600 microseconds. When the multivibrator 528 resets to its stable state, the clamping signal being applied to the emitter of transistor 560 changes from the black level to the blacker-than-black level established by the multivibrator 530 and applied to the base of transistor 558. The base of transistor 558 remains clampedat the blacker-than-black level until multivibrator 530 resets. The base of transistor 558 is clamped at the blacker-than-black level for a time period equal to a vertical synchronizing signal or until the head 16 is in alignment with an adjacent oblique track. During this time interval, capacitor 540 discharges through diode 552 and resistor 626 of the multivibrator 526 such that at the end of the vertical synchronizing interval, capacitor 540 is discharged to the blacker-than-black level.

In summary, as the transducing head 16 crosses the longitudinal edge of the recording medium 17, magnet 80 causes the clamping pulse head 532 to produce a clamping pulse which initiates the vertical blanking and synchronizing signal. The clamp and blanking unit 520 is immediately clamped at the blacker-than-black level by the multivibrator 530 and diode 544. Multivibrator 528 raises the level of the signal applied to the video output device 522 to the black level for a period equal to the time interval between the leading edge of the vertical blanking signal and the time when the vertical synchronizing signal should be inserted. Multivibrator 528 resets beginning the vertical synchronizing signal whereby the video signal is clamped at the blacker-than-black level until the beginning of the next picture signal containing information for the beginning of the next horizontal scan line.

During reproduction of the recorded video signal, the speed of rotation of head 16 is controlled in response to the control signal recorded along the longitudinal edge of the tape and a head position pulse produced in response to the rotation of head 16. The synchronizing head 21 reproduces and applies the control signal to a linear D.C. amplifier 113. The linear D.C. amplifier 113 may comprise any known amplifier capable of amplifying the pulse to a predetermined level and the amplifier illustrated schematically in FIGURE 9 need not be recited in detail since the electrical connections and operations thereof are known in the art. The amplifier 113 applies the amplifier control pulse via a conductor 636 to the comparator 414. Concurrently, the comparator 414 receives a head position pulse from amplifier 82 which receives the pulse from head 81. Comparator 414 produces a resultant signal or voltage signal the magnitude of which is dependent on the phase relation of the signals. The resultant signal is subsequently applied to a lead network and amplifier 490. The lead network and amplifier 490 produces a braking voltage which is applied to the braking winding 43 of the braking motor 39 such that the rotation of the transducing head 16 is in synchronism with the oblique tracks recorded on a recording medium 17.

CONCLUSION

It will be seen that I have provided a tape recorder for recording and reproducing video signals in which the amount of tape needed is greatly reduced due to the head being rotated at an angle to the direction of movement of the tape and in which the signal is recorded and reproduced without loss of clarity in spite of the relatively slow speeds that are employed with such an arrangement. I, moreover, have provided such an arrangement in which the signal is directly recorded on the tape without the use of frequency modulation. This is accomplished by the novel use of various clamping circuits which serve to restore any low frequency components that are lost and which serve to re-insert the vertical synchronizing signal that is lost in the recording process.

It will also be seen that I have employed a novel comparator circuit which permits the transducer head to come up to speed very rapidly and thereafter controls accurately the relative position of the head with respect to the video signal during recording or with respect to a control synchronizing signal produced as a function of the longitudinal speed of the recording media during reproducing.

It will also be seen that I have provided a novel mounting for a recording head in which the head projects only slightly beyond the surface over which the tape passes but in which the tape is held closely in association with the head.

While I have shown a specific embodiment illustrating the teachings of my invention for purposes of illustration, it is to be understood that the invention is to be defined by the appended claims.

What is claimed is:

1. In a transducing system for recording and reproducing high frequency signals utilizing a recording medium which is driven longitudinally at a constant speed adjacent a transducing head rotating at a relatively high speed with respect to the longitudinal direction of movement of said recording medium and at an angle to the longitudinal direction of the recording medium such that the head moves in oblique tracks across said recording medium, said system including control means for synchronizing the head position with the oblique track positions across said recording medium comprising:

means for producing a control signal derived from said high frequency signal;

means responsive to said rotating head for generating a head position pulse for each revolution of said head;

means operatively coupled to said control signal producing means and said head position pulse generating means for comparing the phase relation between said control signal and said head position pulse and developing a resultant signal whose magnitude is dependent upon said phase relation; and braking means responsive to said resultant signal for producing a braking force in a direction which regulates the speed of rotation of said head to synchronize the head position with the oblique track positions across said recording medium.

2. The transducing system of claim 1 further including:

means responsive to said control signal for producing a series of spaced varying voltage pulses the amplitude of each of which steadily changed in an upwardly sloping direction during at least a portion of the pulse duration and in a downwardly sloping direction during a different portion of the pulse duration;

means responsive to said head position pulse for producing a series of spaced uniform voltage pulses having a predetermined polarity the amplitude of each of which remains substantially constant during at least a portion of the pulse duration;

said comparing means being responsive to said varying voltage pulses and said uniform voltage pulses for comparing the phase relation therebetween and for developing a voltage signal the magnitude of which is dependent upon said phase relation and the amplitude of said varying voltage pulses.

3. The transducing system of claim 1 wherein said control means includes transducing means for recording a video signal having synchronizing signals in oblique tracks across said recording medium and wherein said control signal producing means includes a vertical synchronizing signal stripper and an integrator for deriving said control signal from each vertical synchronizing signal of said video signal and at a frequency equal to the frequency of said vertical synchronizing signal.

4. The transducing system of claim 1 wherein said control means includes transducing means for reproducing a video signal having synchronizing signals recorded in oblique tracks across said recording medium and means responsive to said rotating head for generating a vertical clamping pulse each time said head crosses the longitudinal edges of said medium, and wherein said means for deriving a control signal is responsive to a control signal having a frequency equal to the frequency of vertical synchronizing signals of said video signal recorded along the longitudinal edge of said recording medium.

5. In a transducing system for reproducing a video signal, having synchronizing signals and blanking signals, recorded in a series of oblique tracks on a recording medium and a control signal recorded along one of the longitudinal edges of said recording medium, said recording medium being driven longitudinally at a constant speed in a helical path about a transducing head which is rotated obliquely at a relatively high speed with respect to the longitudinal direction of movement of said recording medium, said system comprising:

means for generating a first pulse for each revolution of the transducing head and a second pulse as said head crosses the edges of said recording medium;

means for reproducing said control signal from said one longitudinal edge of said recording medium, said control signal being representative of the positions of said oblique tracks on the recording medium;

control means operatively connected to said pulse generating means and said control signal reproducing means for comparing the phase relation of said first pulse with said control signal to regulate the rotation of said head to maintain alignment between said head and each oblique track;

electrical circuit means including clamping circuit means electrically connected to said head for receiving and passing reproduced recorded signals and to said pulse generating means for receiving said second pulse, said clamping circuit means being responsive to said second pulse for inhibiting said electrical circuit means to prevent passage of the reproduced recorded signals as said head passes said edges of the recording medium;

said clamping circuit means inhibiting said electrical circuit means for a time interval about equal to the time interval required for said head to cross said edges of said recording medium into alignment with an adjacent oblique track.

6. The reproducing apparatus of claim 5 further including:

means responsive to said control signal for producing a series of spaced varying voltage pulses the amplitude of each of which steadily changes in an upwardly sloping direction for at least a portion of the pulse signal and in a downwardly sloping direction during a different portion of the pulse signal;

means responsive to said first pulse for deriving from said first pulses a series of spaced varying voltage pulses the amplitude of each of which is substantially constant and of the same polarity during at least a portion of the first pulse signal;

said control means being responsive to said varying voltage pulses and said substantially constant pulses for producing resultant voltage the magnitude of which is responsive to the phase relation therebetween and to the amplitude of the varying voltage pulses and being operative to vary the speed of rotation of said head in response to the magnitude of said resultant voltage.

7. The apparatus of claim 5 wherein said electrical circuit means includes:

first monostable means responsive to horizontal synchronizing signals of said video signal for establishing and applying to said clamping circuit means a black level signal for clamping the back porch portion of said video signal at said black level, and for producing a blacker-than-black level signal for clamping the horizontal synchronizing signals at said blacker-than-black level prior to the back porch portion of said video signal;

second monostable means responsive to said second pulse for producing and applying to said clamping circuit means a vertical blanking signal at said black level and a vertical synchronizing signal at said blacker-than-black level, said second monostable means producing said vertical synchronizing signal a predetermined time afatr the beginning of said vertical blanking signal such that said vertical synchronizing signal is inserted into said vertical blanking signal to produce a composite video signal from said electrical circuit means.

8. The apparatus of claim 5 for use in reproducing a recorded video signal having horizontal synchronizing and blanking signals and wherein said electrical circuit means includes:

synchronizing signal stripping means electrically connected to said clamping circuit means for determining the presence of each horizontal synchronizing signal within each horizontal blanking signal in said reproduced video signal;

a first monostable circuit means operatively coupled to said clamping means and responsive to each horizontal synchronizing signal from said synchronizing signal stripping means for producing and applying a black level signal to said clamping circuit means for the time duration between the trailing edge of said horizontal synchronizing signal and the trailing edge of said horizontal blanking signal, said first monostable circuit means producing and applying a blacker-than-black level signal to said clamping circuit means to clamp the tip of a subsequent horizontal synchronizing signal at the blacker-than-black level;

a second monostable circuit means operatively coupled to said pulse generating means and responsive to said second pulse for producing and applying a blacker-than-black level signal to said clamping circuit means for a time period about equal to the time period required for a vertical blanking pulse, said blacker-than-black level signal being produced as said head crosses the edges of said recording medium; and a third monostable circuit means operatively coupled to said pulse generating means and responsive to said second pulse for producing and applying a black level signal to said clamping means in coincidence with said blacker-than-black level signal from said second monostable circuit means, said third monostable circuit means producing said black level signal for a predetermined time equal to about the time required between the leading edge of a vertical blanking signal and the leading edge of a vertical synchronizing signal;

said clamping circuit means being operative in response to said monostable circuit means for clamping said reproduced video signal at said black level and said blacker-than-black level such that said electrical circuit means produces a composite video signal as an output having the vertical blanking and synchronizing signals in proper sequence.

9. In a transducing system for recording and reproducing high frequency signals on a recording medium comprising:

means for rotating a transducing head about an axis;

means for driving said recording medium longitudinally at a constant speed in a helical path adjacent said rotating head such that said transducer head moves in oblique tracks across said recording medium;

braking means operatively coupled to said rotating means for producing a braking force to control the speed of rotation of said head;

means for producing a pulse indicative of the transducer head position; and phase sensing means responsive to the head position pulse and to a control signal derived from the high frequency signals for regulating said braking means to control the rotation of said transducing head with respect to the longitudinal speed of said recording medium whereby the position of said transducing head is synchronized to the oblique tracks across said recording medium.

10. In a transducing system for reproducing high frequency signals recorded in a series of oblique tracks on a recording medium, said transducing system including control means for maintaining a predetermined relation between a transducing head which is rotated obliquely at a relatively high speed with respect to a longitudinally moving recording medium, said reproducing system including:

electrical circuit means electrically connected to said transducing head for reproducing and passing the high frequency signals;

means responsive to said reproduced high frequency signals for establishing the operating level of said electrical circuit means as said transducing head reproduces said recorded high frequency signals;

means for generating a clamping pulse when said transducing head crosses the edges of the recording medium onto an adjacent oblique track; and second electrical circuit means responsive to said clamping pulse for establishing a second operating level of said electrical circuit means for inhibiting passage of the signals reproduced by said transducing head until said transducing head is in track alignment with an adjacent oblique track on said recording medium.

References Cited

UNITED STATES PATENTS

| | | |
|---|---|---|
| 3,271,526 | 9/1966 | Cochran et al. |
| 3,322,892 | 5/1967 | Yasuoka et al. |
| 3,327,053 | 6/1967 | Arimura et al. |

ROBERT L. GRIFFIN, *Primary Examiner.*

JOHN W. CALDWELL, *Examiner.*

H. W. BRITTON, *Assistant Examiner.*